US011647493B2

United States Patent
Zhou et al.

(10) Patent No.: US 11,647,493 B2
(45) Date of Patent: May 9, 2023

(54) TECHNIQUES AND APPARATUSES FOR USING A SECOND LINK FOR BEAM FAILURE RECOVERY OF A FIRST LINK

(71) Applicant: QUALCOMM Incorporated, San Diego, CA (US)

(72) Inventors: Yan Zhou, San Diego, CA (US); Sumeeth Nagaraja, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 16/138,545

(22) Filed: Sep. 21, 2018

(65) Prior Publication Data
US 2019/0110281 A1    Apr. 11, 2019

Related U.S. Application Data

(60) Provisional application No. 62/569,002, filed on Oct. 6, 2017.

(51) Int. Cl.
*H04W 72/044* (2023.01)
*H04B 7/06* (2006.01)
(Continued)

(52) U.S. Cl.
CPC ........ *H04W 72/046* (2013.01); *H04B 7/0695* (2013.01); *H04B 7/088* (2013.01);
(Continued)

(58) Field of Classification Search
CPC ...... H04L 45/28; H04W 72/08; H04W 76/19; H04W 24/04; H04W 16/28; H04W 72/046; H04B 7/0695; H04B 7/088
See application file for complete search history.

(56) References Cited

U.S. PATENT DOCUMENTS 9,706,382 B2 *   7/2017   Hyde .................. H04L 12/1457
10,542,545 B2 *   1/2020   Yu ........................ H04B 7/0695
(Continued)

FOREIGN PATENT DOCUMENTS

WO    2013155265 A1    10/2013
WO    2017024516 A1    2/2017

OTHER PUBLICATIONS

Huawei, et al: "Procedure Details for Beam Failure Recovery," 3GPP Draft; R1-1709930, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017, XP051299155, 6 pages, Retrieved from the Internet: URL: http://www.3gpp.org/ftp/Meetings_3GPP_sync/ran1/Docs/ [retrieved on Jun. 26, 2017].
(Continued)

*Primary Examiner* — Robert C Scheibel
*Assistant Examiner* — Prenell P Jones
(74) *Attorney, Agent, or Firm* — Harrity & Harrity, LLP

(57) ABSTRACT

Certain aspects of the present disclosure generally relate to wireless communication. In some aspects, a first apparatus may detect a beam failure of a first link between the first apparatus and a second apparatus; transmit a beam failure recovery request indicating the beam failure of the first link, wherein the beam failure recovery request is transmitted via a second link of the first apparatus; and perform a beam failure recovery procedure, to select one or more beams for communication between the first apparatus and the second apparatus, based at least in part on transmitting the beam failure recovery request via the second link. Numerous other aspects are provided.

38 Claims, 19 Drawing Sheets

(51) Int. Cl.
*H04W 76/19* (2018.01)
*H04B 7/08* (2006.01)
*H04W 16/28* (2009.01)
*H04W 24/04* (2009.01)

(52) U.S. Cl.
CPC .......... *H04W 16/28* (2013.01); *H04W 24/04* (2013.01); *H04W 76/19* (2018.02)

(56) References Cited

U.S. PATENT DOCUMENTS

| | | | | |
|---|---|---|---|---|
| 2007/0268862 A1* | 11/2007 | Singh | .................... | H04W 76/14 370/329 |
| 2011/0170526 A1 | 7/2011 | Hsieh et al. | | |
| 2014/0269409 A1* | 9/2014 | Dimou | .................... | H04W 8/24 370/254 |
| 2015/0005027 A1* | 1/2015 | Zeng | .................... | H04W 52/367 455/522 |
| 2016/0360533 A1* | 12/2016 | Bennett | .................. | H04B 7/022 |
| 2017/0026951 A1* | 1/2017 | Lou | .......................... | H04L 5/001 |
| 2017/0033858 A1* | 2/2017 | Calcev | .................... | H04B 7/14 |
| 2017/0259811 A1* | 9/2017 | Coulter | ................. | B60L 15/025 |
| 2018/0227899 A1* | 8/2018 | Yu | ........................... | H04B 7/088 |
| 2018/0270689 A1* | 9/2018 | Akkarakaran | ....... | H04B 7/0639 |
| 2018/0302889 A1* | 10/2018 | Guo | ........................ | H04B 7/088 |
| 2018/0350180 A1* | 12/2018 | Onischuk | ............... | G07C 13/00 |
| 2018/0368126 A1* | 12/2018 | Islam | .................... | H04B 7/0695 |
| 2018/0375556 A1* | 12/2018 | Wang | .................... | H04W 16/28 |
| 2019/0044792 A1* | 2/2019 | Kwon | .................... | H04W 52/18 |
| 2019/0053072 A1* | 2/2019 | Kundargi | ............. | H04B 7/0626 |
| 2019/0053312 A1* | 2/2019 | Xia | ...................... | H04W 72/046 |
| 2019/0053313 A1* | 2/2019 | Zhou | .................... | H04W 52/146 |
| 2019/0053314 A1* | 2/2019 | Zhou | .................... | H04B 7/0695 |
| 2019/0081687 A1* | 3/2019 | Sadiq | ...................... | H04L 5/001 |
| 2019/0357264 A1* | 11/2019 | Yi | ........................... | H04L 5/001 |
| 2019/0387440 A1* | 12/2019 | Yiu | .................. | H04W 36/0072 |
| 2020/0029237 A1* | 1/2020 | Kim | ...................... | H04W 68/02 |
| 2020/0059397 A1* | 2/2020 | da Silva | ................ | H04L 7/0008 |
| 2020/0059398 A1* | 2/2020 | Pan | .................... | H04W 72/0413 |
| 2020/0178338 A1* | 6/2020 | Ahn | .................... | H04B 7/0695 |
| 2020/0244337 A1* | 7/2020 | Yuan | ...................... | H04W 76/27 |
| 2020/0358574 A1* | 11/2020 | Jung | .................... | H04L 5/0023 |
| 2021/0385896 A1* | 12/2021 | Kim | .................. | H04W 36/0027 |

OTHER PUBLICATIONS

Huawei, et al: "Procedure Details for Beam Failure Recovery," 3GPP Draft; R1-1712224, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051315041, 12 pages, Retrieved from the Internet: URL: http://www.3gpp.org/ftp/Meetings_3GPP_sync/ran1/Docs/ [retrieved on Aug. 20, 2017].
International Search Report and Written Opinion—PCT/US2018/052454—ISA/EPO—dated Jan. 8, 2019.
Taiwan Search Report—TW107133599—TIPO—dated Oct. 12, 2021.

* cited by examiner

TECHNIQUES AND APPARATUSES FOR USING A SECOND LINK FOR BEAM FAILURE RECOVERY OF A FIRST LINK

CROSS-REFERENCE TO RELATED APPLICATIONS UNDER 35 U.S.C. § 119

This application claims priority to U.S. Provisional Patent Application No. 62/569,002, filed on Oct. 6, 2017, entitled "TECHNIQUES AND APPARATUSES FOR USING A SECOND LINK FOR BEAM FAILURE RECOVERY OF A FIRST LINK," which is hereby expressly incorporated by reference herein.

FIELD OF THE DISCLOSURE

Aspects of the present disclosure generally relate to wireless communication, and more particularly to techniques and apparatuses for using a second link for beam failure recovery of a first link.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include detecting, by a first apparatus, a beam failure of a first link between the first apparatus and a second apparatus; transmitting, by the first apparatus, a beam failure recovery request indicating the beam failure of the first link, wherein the beam failure recovery request is transmitted via a second link of the first apparatus; and performing, by the first apparatus, a beam failure recovery procedure, to select one or more beams for communication between the first apparatus and the second apparatus, based at least in part on transmitting the beam failure recovery request via the second link.

In some aspects, a first apparatus for wireless communication may include memory and one or more processors operatively coupled to the memory. The memory and the one or more processors may be configured to detect a beam failure of a first link between the first apparatus and a second apparatus; transmit a beam failure recovery request indicating the beam failure of the first link, wherein the beam failure recovery request is transmitted via a second link of the first apparatus; and perform a beam failure recovery procedure, to select one or more beams for communication between the first apparatus and the second apparatus, based at least in part on transmitting the beam failure recovery request via the second link.

In some aspects, a non-transitory computer-readable medium may store one or more instructions for wireless communication. The one or more instructions, when executed by one or more processors of a first apparatus, may cause the one or more processors to detect a beam failure of a first link between the first apparatus and a second apparatus; transmit a beam failure recovery request indicating the beam failure of the first link, wherein the beam failure recovery request is transmitted via a second link of the first apparatus; and perform a beam failure recovery procedure, to select one or more beams for communication between the first apparatus and the second apparatus, based at least in part on transmitting the beam failure recovery request via the second link.

In some aspects, a first apparatus for wireless communication may include means for detecting a beam failure of a first link between the first apparatus and a second apparatus; means for transmitting a beam failure recovery request indicating the beam failure of the first link, wherein the beam failure recovery request is transmitted via a second link of the first apparatus; and means for performing a beam failure recovery procedure, to select one or more beams for communication between the first apparatus and the second apparatus, based at least in part on transmitting the beam failure recovery request via the second link.

In some aspects, a method of wireless communication may include receiving, from a first apparatus, a beam failure recovery request indicating a beam failure of a first link between the first apparatus and a second apparatus, wherein the beam failure recovery request is received via a second link of the second apparatus; and initiating, by the second apparatus, a beam failure recovery procedure, to select one or more beams for communication between the first apparatus and the second apparatus, based at least in part on receiving the beam failure recovery request via the second link.

In some aspects, a second apparatus for wireless communication may include memory and one or more processors operatively coupled to the memory. The memory and the one or more processors may be configured to receive, from a first apparatus, a beam failure recovery request indicating a beam failure of a first link between the first apparatus and the second apparatus, wherein the beam failure recovery request is received via a second link of the second apparatus; and initiate a beam failure recovery procedure, to select one or more beams for communication between the first apparatus and the second apparatus, based at least in part on receiving the beam failure recovery request via the second link.

In some aspects, a non-transitory computer-readable medium may store one or more instructions for wireless communication. The one or more instructions, when executed by one or more processors of a second apparatus, may cause the one or more processors to receive, from a first apparatus, a beam failure recovery request indicating a beam failure of a first link between the first apparatus and the second apparatus, wherein the beam failure recovery request is received via a second link of the second apparatus; and initiate a beam failure recovery procedure, to select one or more beams for communication between the first apparatus and the second apparatus, based at least in part on receiving the beam failure recovery request via the second link.

In some aspects, a second apparatus for wireless communication may include means for receiving, from a first apparatus, a beam failure recovery request indicating a beam failure of a first link between the first apparatus and the second apparatus, wherein the beam failure recovery request is received via a second link of the second apparatus; and means for initiating a beam failure recovery procedure, to select one or more beams for communication between the first apparatus and the second apparatus, based at least in part on receiving the beam failure recovery request via the second link.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
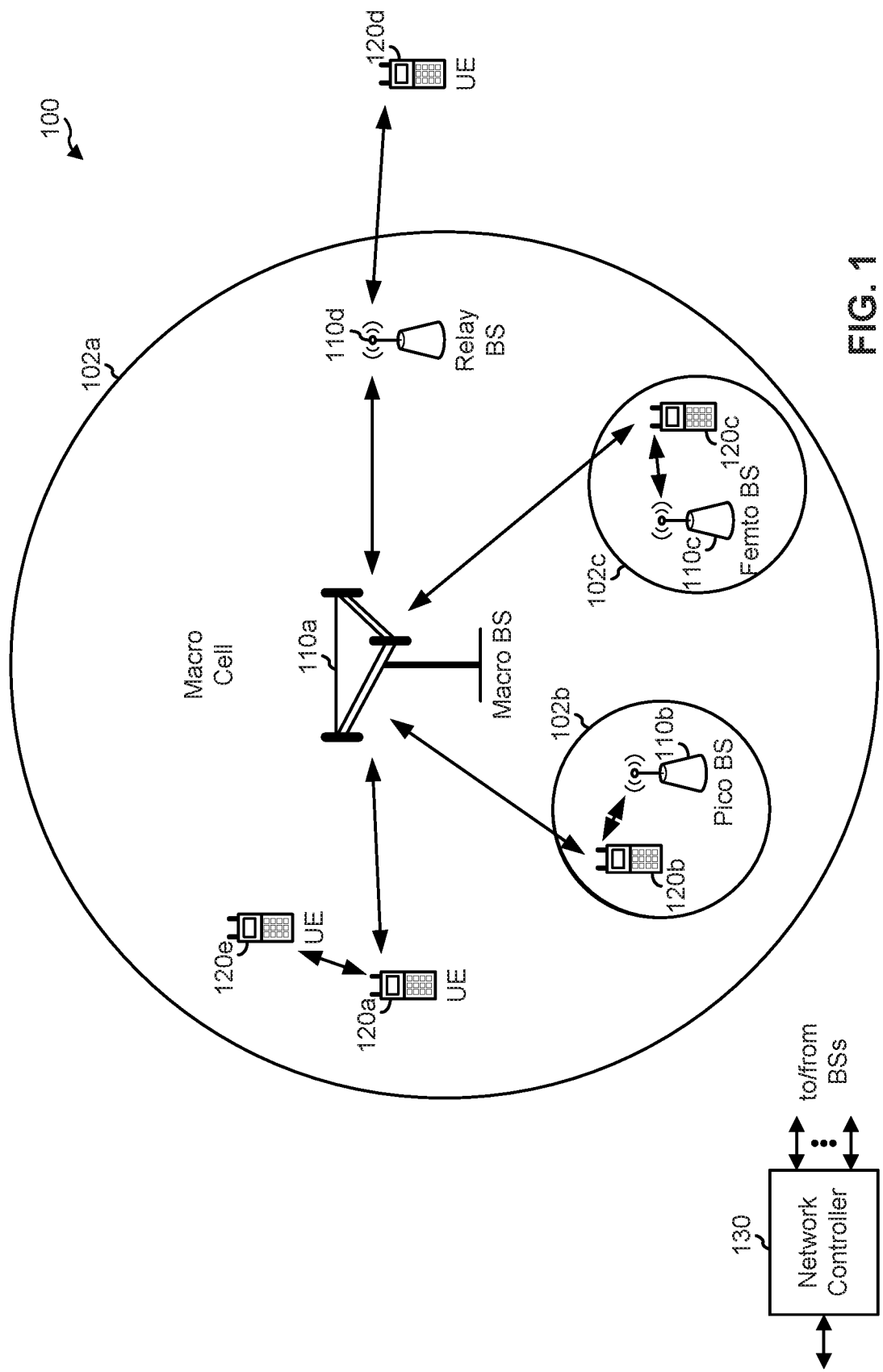
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
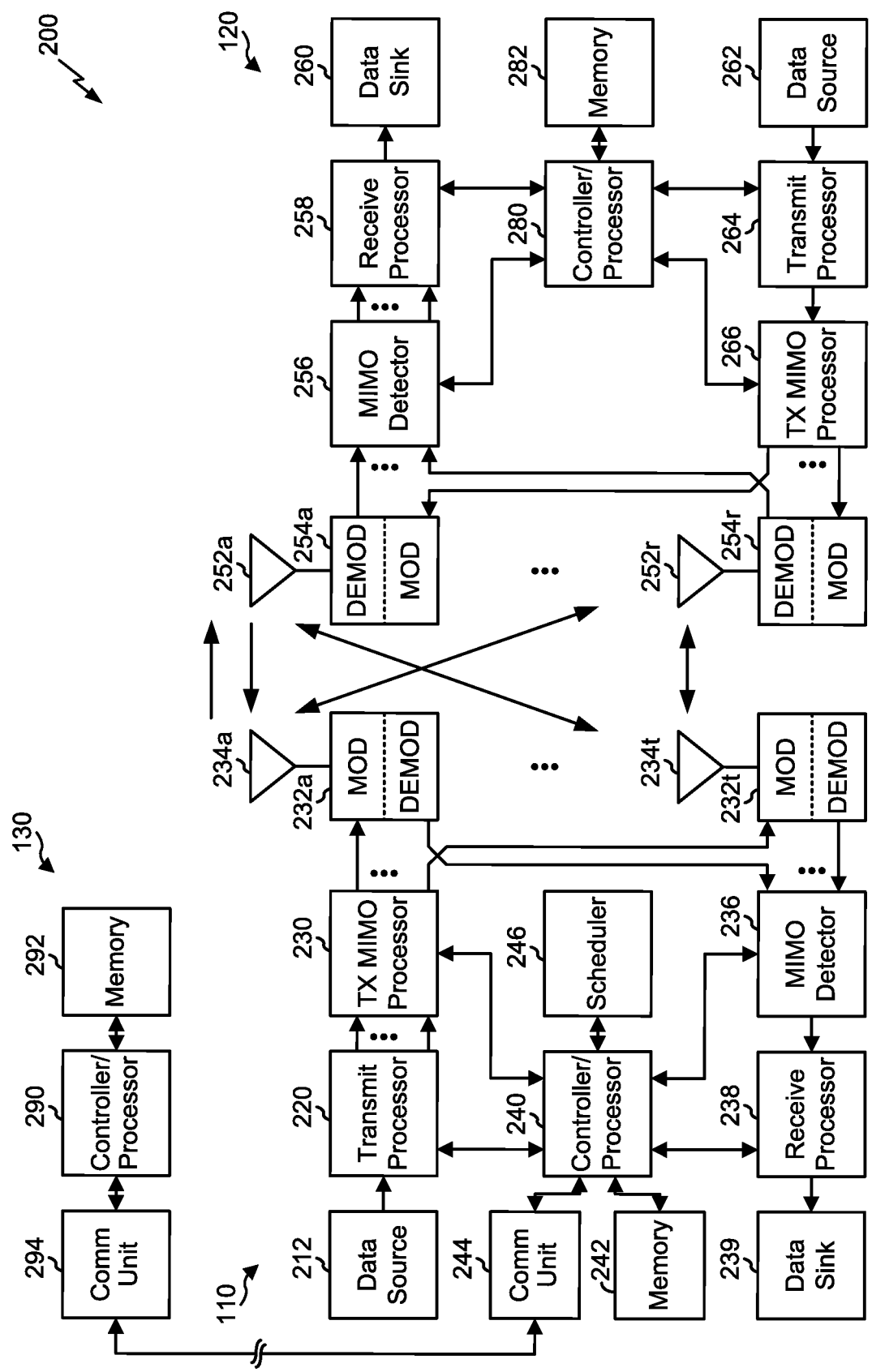
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with using a second link for beam failure recovery of a first link, as described in more detail elsewhere herein. For example, controller/processor 240 of base station 110, controller/processor 280 of UE 120, and/or any other component(s) of FIG. 2 may perform or direct operations of, for example, process 1800 of FIG. 18, process 1900 of FIG. 19, and/or other processes as described herein. Memories 242 and 282 may store data and program codes for base station 110 and UE 120, respectively. A scheduler 246 may schedule UEs for data transmission on the downlink and/or uplink.

In some aspects, a first apparatus (e.g., UE 120, base station 110, and/or the like) may include means for detecting a beam failure on a first link between the first apparatus and a second apparatus; means for transmitting a beam failure recovery request indicating the beam failure on the first link, wherein the beam failure recovery request is transmitted via a second link of the first apparatus; means for performing a beam failure recovery procedure to select one or more beams for communication between the first apparatus and the second apparatus; and/or the like. Additionally, or alternatively, a second apparatus (e.g., UE 120, base station 110, and/or the like) may include means for receiving, from a first apparatus, a beam failure recovery request indicating a beam failure on a first link between the first apparatus and the second apparatus, wherein the beam failure recovery request is received via a second link of the second apparatus; means for initiating a beam failure recovery procedure to select one or more beams for communication between the first apparatus and the second apparatus; and/or the like. In some aspects, such means may include one or more components of UE 120 and/or base station 110 described in connection with FIG. 2.

As indicated above, FIG. 2 is provided merely as an example. Other examples are possible and may differ from what was described with regard to FIG. 2.

Figure 3:
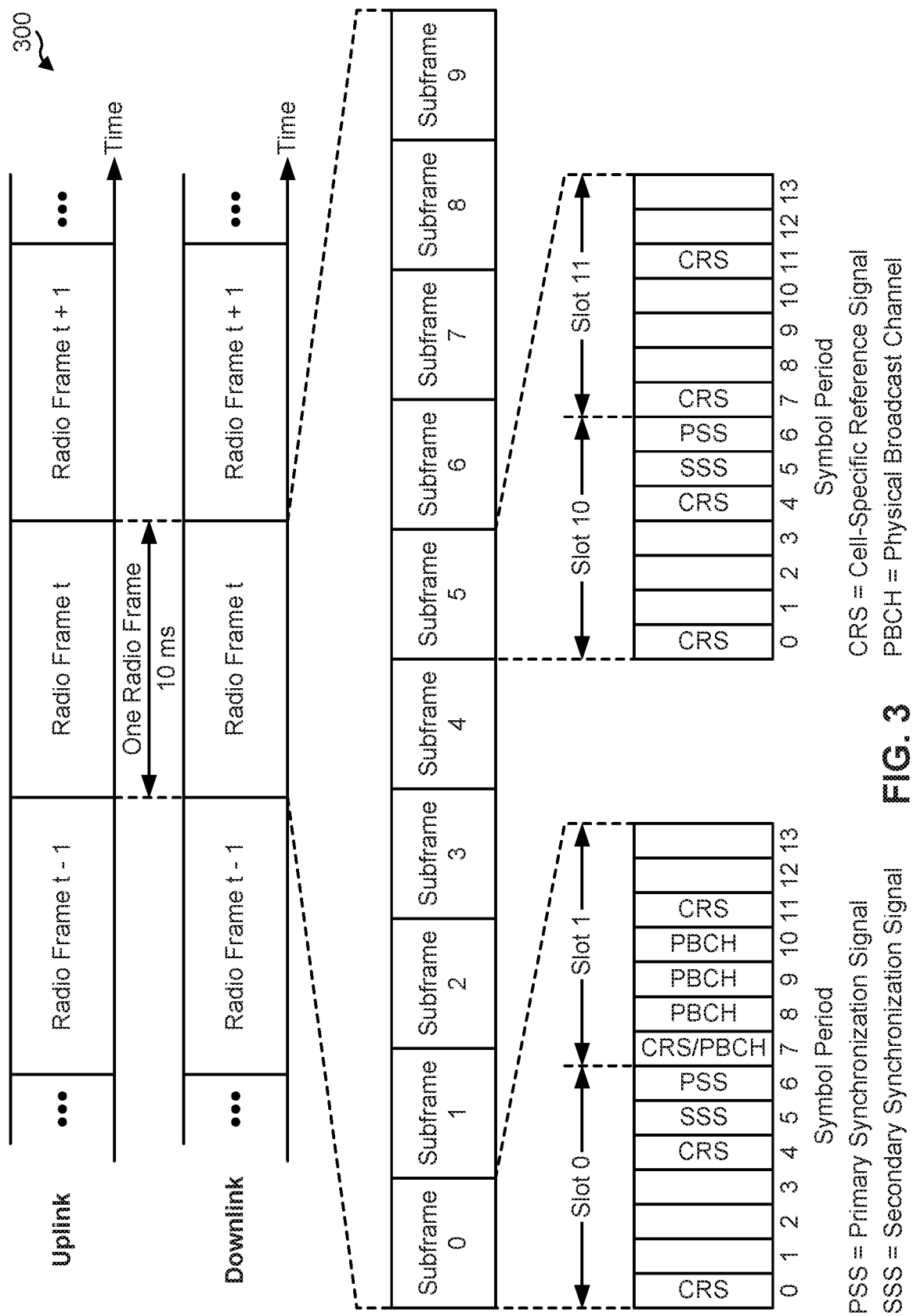
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
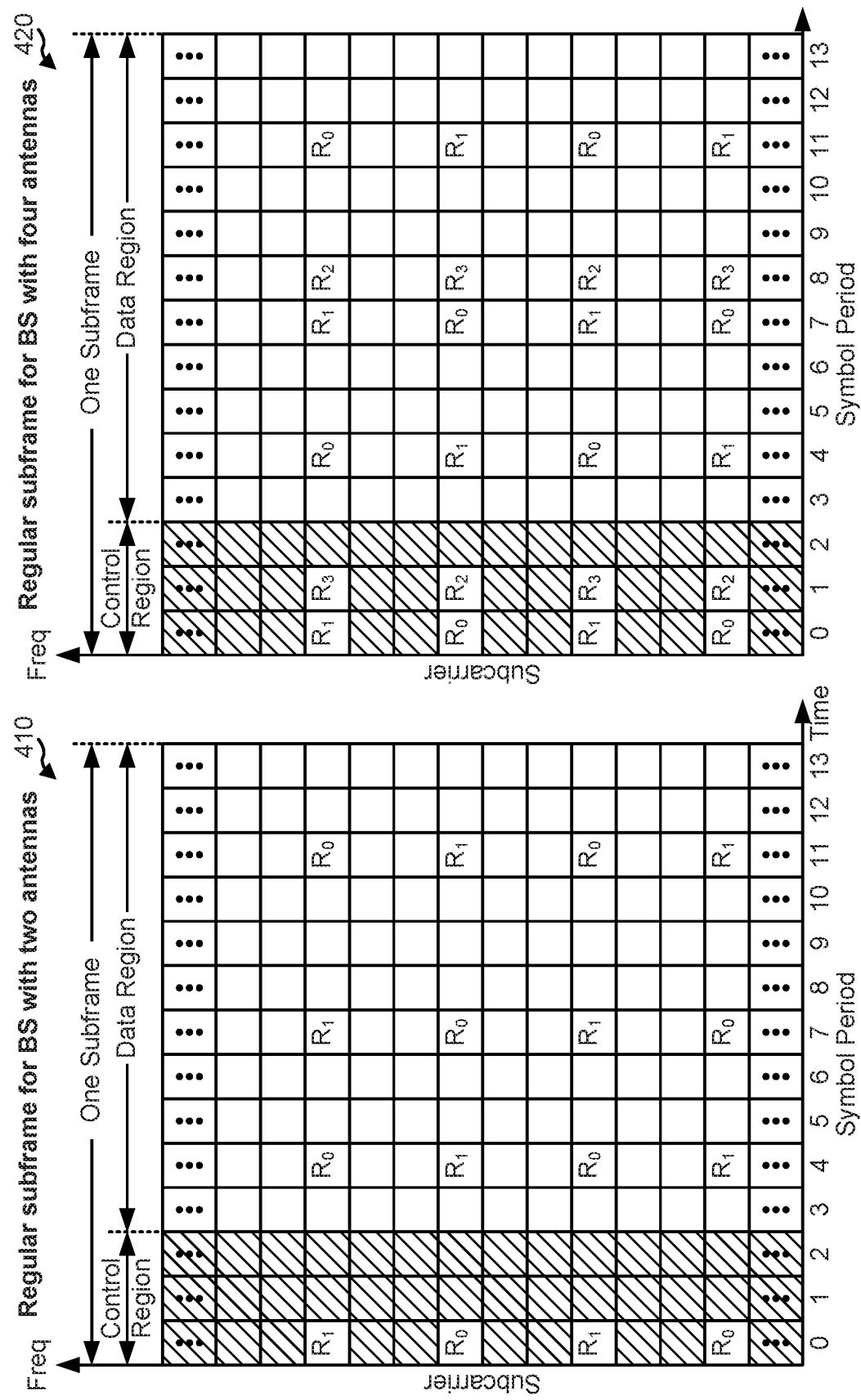
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
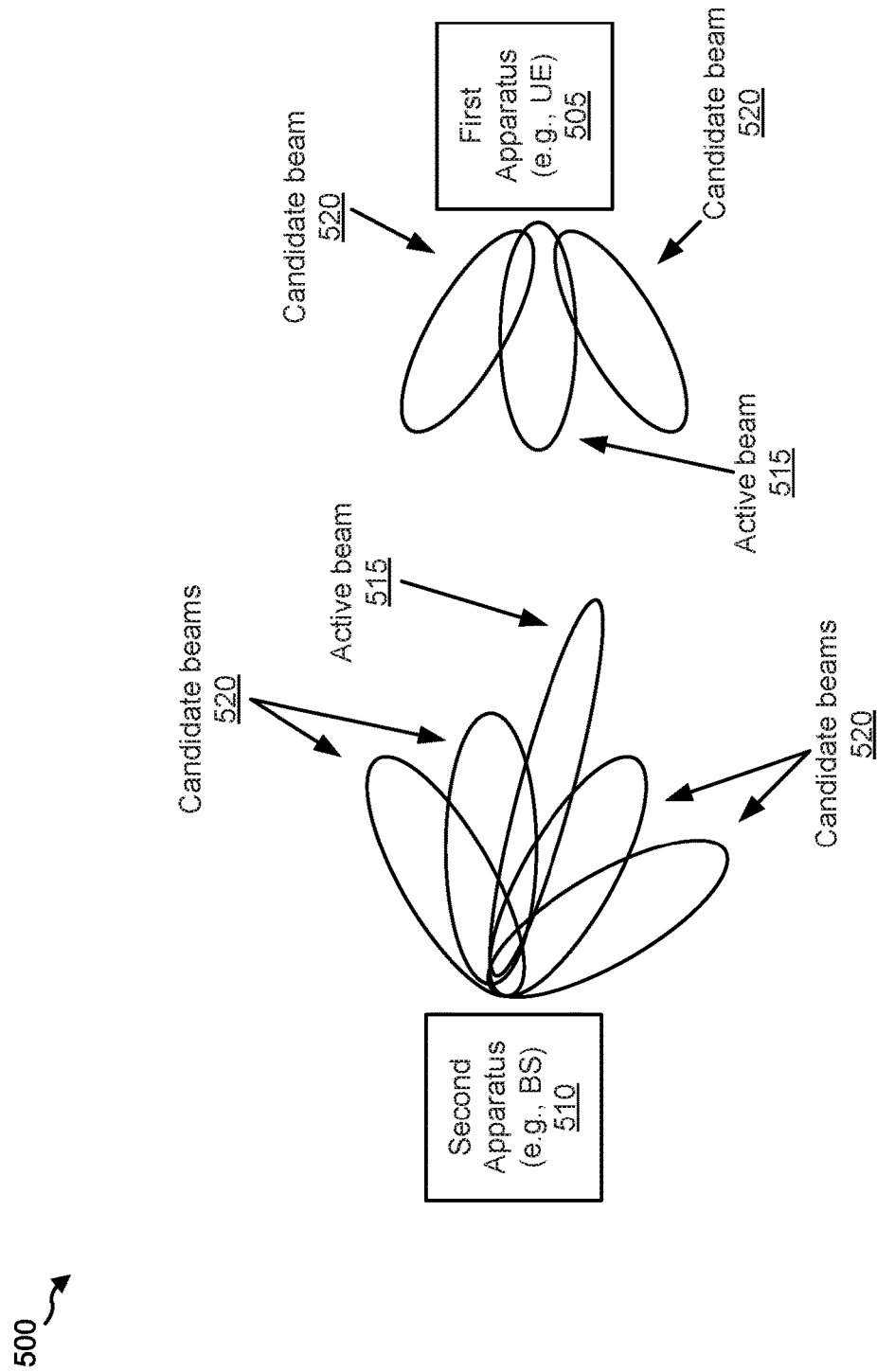
FIG. 5 is a diagram illustrating an example of wireless communications via one or more beams, in accordance with certain aspects of the present disclosure.

FIG. 5 is a diagram illustrating an example 500 of wireless communications via one or more beams, in accordance with various aspects of the present disclosure.

As shown in FIG. 5, a first apparatus 505 (e.g., shown as a UE in example 500) may communicate with a second apparatus 510 (e.g., shown as a base station in example 500) using one or more active beams 515. In some aspects, the first apparatus 505 and the second apparatus 510 may also be capable of communicating via one or more candidate beams 520. In some aspects, an active beam 515 may be selected from a set of candidate beams 520 by comparing beam parameters (e.g., RSRP, RSRQ, RSSI, and/or the like) of the set of candidate beams 520. For example, an active beam 515 may be the beam that has the best beam parameters among all beams in the set of candidate beams 520. In some aspects, the beams may operate in a millimeter wave radio frequency band.

In some aspects, if the active beam 515 experiences a failure, the first apparatus 505 may carry out a time-consuming and power inefficient beam failure recovery procedure. For example, upon detecting the failure of the active beam 515, the first apparatus 505 may attempt to communicate with the second apparatus 510 by transmitting a beam failure recovery request (BFRR) via one or more candidate beams 520. In some cases, all previously identified candidate beams 520 may fail to pass the BFRR to the second apparatus 510. In this situation, the first apparatus 505 may have to wait for a periodic reference signal to be transmitted by the second apparatus 510 via a set of pre-configured beams covering all directions before the first apparatus 505 can measure the periodic reference signal, identify new candidate beams 520, and transmit the BFRR via the new candidate beam 520. Additionally, or alternatively, the first apparatus 505 may attempt to transmit a BFRR via multiple candidate beams 520 in sequence (e.g., using a contention-free random access (CFRA) procedure), and may use a candidate beam 520 as an active beam 515 if the first apparatus 505 receives a response to the BFRR on the candidate beam 520. Otherwise, the first apparatus 505 may send the BFRR via the next candidate beam 520. If the first apparatus 505 does not receive any response using the CFRA procedure, then the first apparatus 505 may perform a contention-based random access (CBRA) procedure to try to reach the second apparatus 510 via random access channel (RACH) time slots configured for different Rx beams of the second apparatus 510, and hence can inform the second apparatus 510 to start beam management and refinement.

This beam failure recovery procedure may be time-consuming, may waste resources of the first apparatus 505 (e.g., processor resources, memory resources, battery power, and/or the like), may waste network resources (e.g., time and frequency resources), and/or the like. Furthermore, if the first apparatus 505 has data to be transmitted, the above beam failure recovery procedure may result in long delays in data transmission, particularly if a random access channel (RACH) periodicity is long (e.g., a periodicity for transmission of a RACH preamble to inform the second apparatus 510). Some techniques and apparatuses described herein permit a second link between apparatuses to be used to assist with beam failure recovery of a first link between the apparatuses, thereby conserving resources of the apparatus, conserving network resources, reducing data transmission delays, and/or the like. Additional details are described below.

As indicated above, FIG. 5 is provided merely as an example. Other examples are possible and may differ from what was described with regard to FIG. 5.

Figure 6:
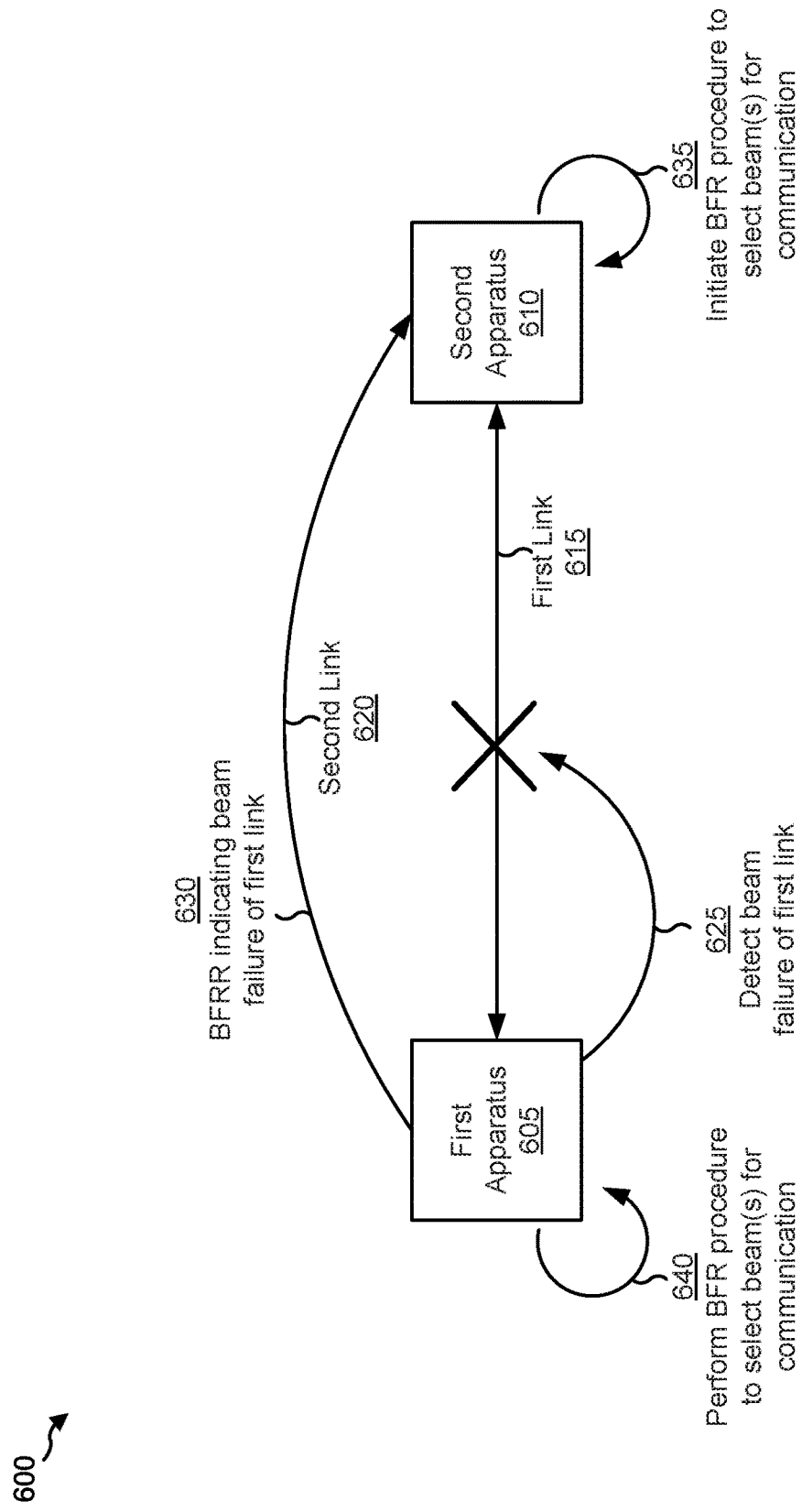
FIGS. 6-17 are diagrams illustrating examples of using a second link for beam failure recovery of a first link, in accordance with various aspects of the present disclosure.

FIG. 6 is a diagram illustrating an example 600 of using a second link for beam failure recovery of a first link, in accordance with various aspects of the present disclosure.

As shown in FIG. 6, a first apparatus 605 may be capable of communicating with a second apparatus 610 via a first link 615 and a second link 620. In some aspects, the first apparatus 605 and/or the second apparatus 610 may include a UE (e.g., the UE 120), a base station (e.g., the base station 110), and/or the like. For example, the first apparatus 605 may include a first UE 120, and the second apparatus 610 may include a second UE 120. As another example, the first apparatus 605 may include a UE 120, and the second apparatus 610 may include a base station 110. As another example, the first apparatus 605 may include a base station 110, and the second apparatus 610 may include a UE 120. As another example, the first apparatus 605 may include a first base station 110, and the second apparatus 610 may include a second base station 110.

As shown by reference number 625, the first apparatus 605 may detect a beam failure of the first link 615 between the first apparatus 605 and the second apparatus 610. In some aspects, the first link 615 is a direct link between the first apparatus 605 and the second apparatus 610 with no intervening apparatuses on the first link 615 (e.g., a device-to-device (D2D) link, a BS-to-UE link, a sidelink, and/or the like). In some aspects, the first link 615 is a link that supports beamforming, such as a millimeter wave link (e.g., a link in the millimeter wave frequency band) and/or the like. In some aspects, the beam failure is a full failure of all serving control channels associated with the first apparatus 605 and/or the first link 615. In some aspects, the beam failure is a partial failure of the serving control channels associated with the first apparatus 605 and/or the first link 615 (e.g., a failure of a subset of the serving control channels).

As shown by reference number 630, the first apparatus 605 may transmit, via the second link 620, a beam failure recovery request (BFRR) indicating a beam failure of the first link 615. In some aspects, the second link 620 is another direct link between the first apparatus 605 and the second apparatus 610 with no intervening apparatuses on the second link 620. In some aspects, the second link 620 is an indirect link between the first apparatus 605 and the second apparatus 610 (e.g., with one or more intervening apparatuses on the second link 620 that relay the BFRR). The second link 620 may include, for example, a wireless link, a wired link, or some combination thereof. In some aspects, the first link 615 and the second link 620 use a same frequency band. For example, the first link 615 and the second link 620 may both use a millimeter wave frequency band. In some aspects, the first link 615 and the second link 620 use different frequency bands. For example, the first link 615 may use a millimeter wave frequency band, and the second link 620 may use a sub-6 gigahertz (GHz) frequency band (e.g., for increased reliability). In some aspects, the second link 620 is an ultra-reliable low latency communication (URLLC) link.

In some aspects, the first apparatus 605 may transmit the BFRR via the second link 620 based at least in part on determining that the first apparatus 605 has transmitted a threshold number of BFRRs via the first link 615 without a response from the second apparatus 610. For example, the first apparatus 605 may first attempt to perform beam failure recovery via the first link 615, and may attempt to perform beam failure recovery via the second link 620 after determining that the beam failure recovery has failed on the first link 615. In some aspects, the first apparatus 605 may attempt beam failure recovery on the first link 615 and the second link 620 in parallel (e.g., concurrently). For example, upon detecting beam failure of the first link 615, the first apparatus 605 may transmit a first BFRR via the first link 615, and may transmit a second BFRR via the second link 620 (e.g., without waiting for a response to the BFRR transmitted via the first link 615). In this way, the first apparatus 605 may reduce a beam failure recovery time. Alternatively, upon detecting beam failure of the first link 615, the first apparatus 605 may transmit a BFRR via the second link 620 without transmitting a BFRR via the first link 615. In this way, the first apparatus 605 may conserve resources of the first apparatus 605, may conserve network resources, and/or the like.

As shown by reference number 635, the second apparatus 610 may initiate a beam failure recovery (BFR) procedure to select a beam (e.g., an active beam) for communication between the first apparatus 605 and the second apparatus 610. In some aspects, the BFRR may be used to initiate the BFR procedure, and the second apparatus 610 may initiate the BFR procedure based at least in part on receiving the BFRR via the second link 620. For example, the BFRR may indicate that an active beam (e.g., the first link 615) between the first apparatus 605 and the second apparatus 610 has failed, and may trigger a BFR procedure for the first apparatus 605 and/or the second apparatus 610 to identify a beam to be used as a new active beam between the first apparatus 605 and the second apparatus 610.

As shown by reference number 640, the first apparatus 605 may perform a BFR procedure to select a beam (e.g., an active beam) for communication between the first apparatus 605 and the second apparatus 610. For example, transmission of the BFRR by the first apparatus 605 and/or receipt of the BFRR by the second apparatus 610 may trigger the BFR procedure, and the first apparatus 605 and the second apparatus 610 may communicate with one another to perform the BFR procedure, as described in more detail elsewhere herein. This BFR procedure may conserve resources of the first apparatus 605 and/or the second apparatus 610, may conserve network resources, may reduce communication delays, and/or the like as compared to a BFR procedure that does not utilize the second link 620 between the first apparatus 605 and the second apparatus 610. Additional details are described below.

As indicated above, FIG. 6 is provided merely as an example. Other examples are possible and may differ from what was described with regard to FIG. 6.

Figure 7:
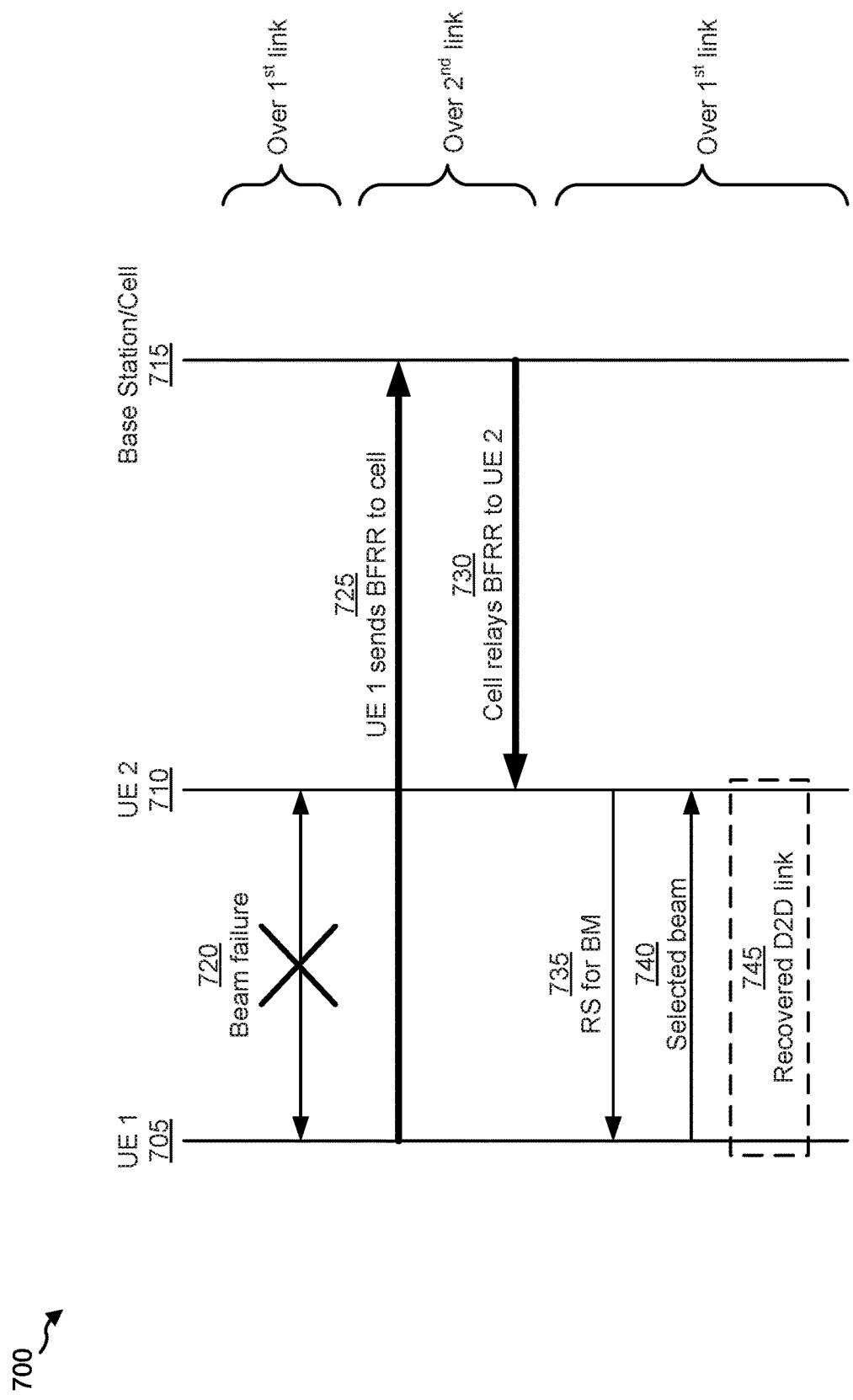

FIG. 7 is a diagram illustrating another example 700 of using a second link for beam failure recovery of a first link, in accordance with various aspects of the present disclosure.

As shown in FIG. 7, the first apparatus may be a first UE 705, and the second apparatus may be a second UE 710. The first UE 705 and/or the second UE 710 may correspond to one or more UEs described elsewhere herein. As further shown, the first link may be a direct link between the first UE 705 and the second UE 710, and the second link may be an indirect link between the first UE 705 and the second UE 710 via a base station 715. The base station 715 may correspond to one or more base stations described elsewhere herein.

In example 700, the first UE 705 and the second UE 710 are connected to the same base station 715. In this case, the first UE 705 may transmit the BFRR to the base station 715 via the second link, and the base station 715 may relay the BFRR to the second UE 710. In some aspects, the first link (e.g., between the first UE 705 and the second UE 710) and the second link (e.g., between the first UE 705 and the base station 715) may both use a millimeter wave frequency band. In some aspects, the first link (e.g., between the first UE 705 and the second UE 710) may use the millimeter wave frequency band, and the second link (e.g., between the first UE 705 and the base station 715) may use a sub-6 GHz frequency band.

As shown by reference number 720, the first UE 705 may detect a beam failure of the first link between the first UE 705 and the second UE 710, in a similar manner as described above in connection with FIG. 6.

As shown by reference number 725, the first UE 705 may transmit a BFRR, indicating the beam failure of the first link, via a second link between the first UE 705 and the base station 715. As shown by reference number 730, the base station 715 may relay the BFRR to the second UE 710. In some aspects, the first UE 705 may include, in the BFRR, a UE identifier that identifies the second UE 710 (e.g., an international mobile subscriber identity (IMSI), an Internet Protocol (IP) address, a mobile directory number (MDN), and/or the like), and the base station 715 may use the UE identifier to relay the BFRR to the second UE 710.

In some aspects, prior to transmitting the BFRR to the base station 715, the first UE 705 may determine whether the first UE 705 and the second UE 710 are connected to the same base station 715. For example, the second UE 710 may transmit, to the first UE 705, a cell identifier that identifies the cell to which the second UE 710 is connected. In some aspects, the second UE 710 may transmit the cell identifier to the first UE 705 during a procedure to negotiate and/or establish the first link. Additionally, or alternatively, the second UE 710 may periodically transmit the cell identifier to the first UE 705 (e.g., via the first link). Additionally, or alternatively, the second UE 710 may transmit the cell identifier to the first UE 705 based at least in part on occurrence of an event (e.g., a change in the cell to which the second UE 710 is connected).

In some aspects, the first UE 705 may transmit the BFRR to the base station 715 via the second link based at least in part on determining that the first UE 705 and the second UE 710 are connected to the same base station 715. In this case, the first UE 705 may transmit the BFRR only if the first UE 705 and the second UE 710 are connected to the same base station 715. Alternatively, the first UE 705 may transmit the BFRR regardless of whether the first UE 705 and the second UE 710 are connected to the same base station 715, and the base station 715 may identify whether the second UE 710 is connected to the base station 715 or another base station (e.g., and may relay the BFRR accordingly).

As shown by reference number 735, upon receiving the BFRR relayed by the base station 715, the second UE 710 may initiate a beam failure recovery procedure to select one or more beams for communication between the first UE 705 and the second UE 710. For example, the second UE 710 may transmit one or more reference signals (e.g., shown as RS) on one or more beams according to a beam management procedure (e.g., shown as BM). In some aspects, the second UE 710 may perform beam sweeping by transmitting reference signals on multiple beams (e.g., all configured beams, a subset of all configured beams, and/or the like).

As shown by reference number 740, the first UE 705 may perform a beam failure recovery procedure to select one or more beams for communication between the first UE 705 and the second UE 710. For example, the first UE 705 may measure reference signals transmitted by the second UE 710, and may compare the reference signals to identify a beam to be used as an active beam for communications between the first UE 705 and the second UE 710. For example, the first UE 705 may select a beam associated with a better signal power, a better signal quality, a better signal strength, and/or the like, as compared to other beams. As shown, the first UE 705 may indicate the selected beam to the second UE 710 (e.g., by transmitting a beam index that identifies the selected beam).

As shown by reference number 745, the first UE 705 and the second UE 710 may recover a failed link (e.g., the failed first link, which is a D2D link). In some aspects, the selected beam may be the same beam that previously failed (e.g., which may be fine-tuned via an exchange of beam configuration parameters between the first UE 705 and the second UE 710). In some aspects, the selected beam may be a different beam than the beam that previously failed.

By using the second link of the first UE 705 to assist with beam failure recovery when the first link of the first UE 705 fails, resources of the first UE 705 and/or the second UE 710 may be conserved, network resources may be conserved, and communication delays may be reduced as compared to a beam failure recovery procedure that does not use the second link to assist with beam failure recovery.

As indicated above, FIG. 7 is provided merely as an example. Other examples are possible and may differ from what was described with regard to FIG. 7.

Figure 8:
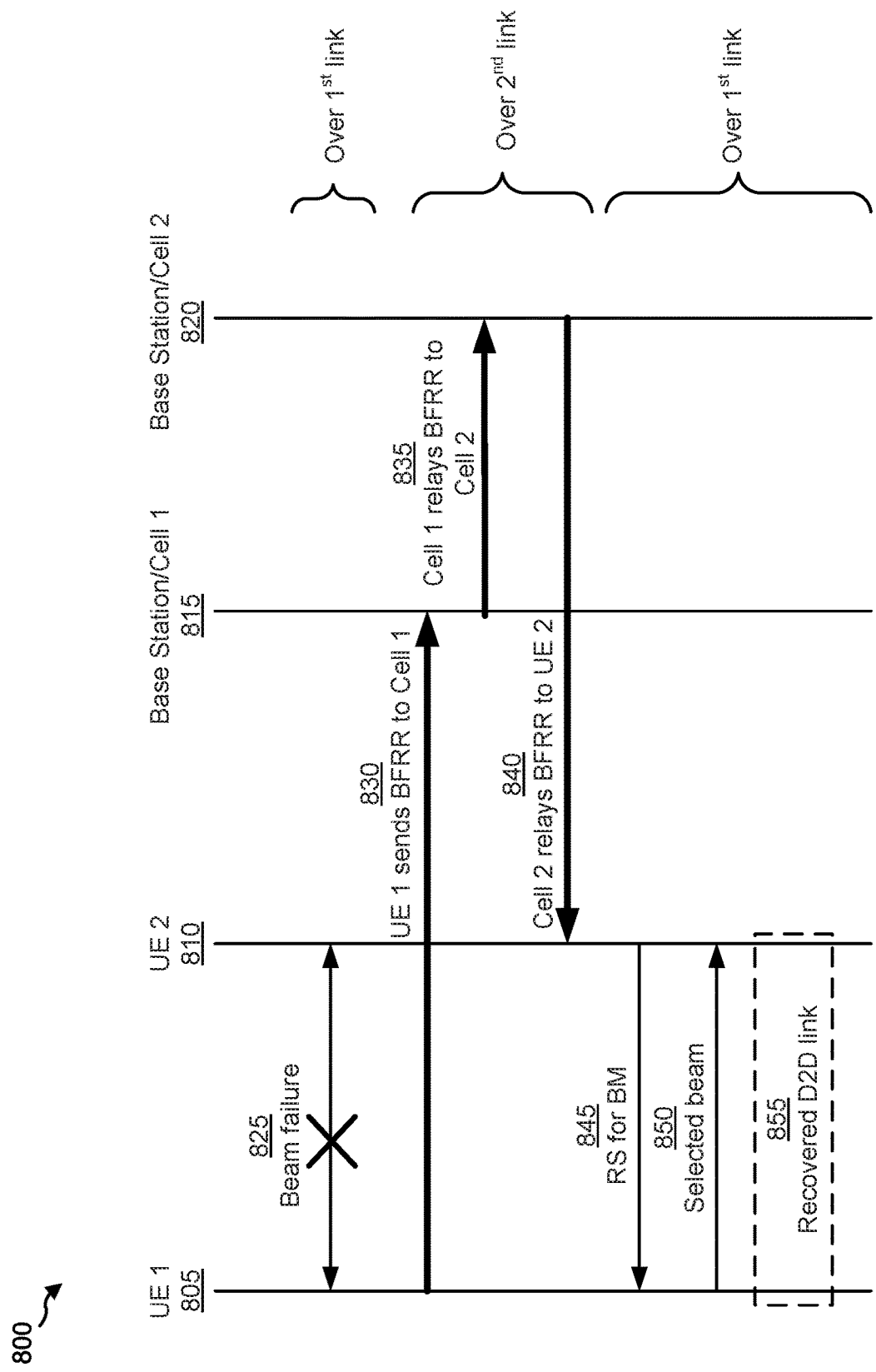

FIG. 8 is a diagram illustrating another example 800 of using a second link for beam failure recovery of a first link, in accordance with various aspects of the present disclosure.

As shown in FIG. 8, the first apparatus may be a first UE 805, and the second apparatus may be a second UE 810. The first UE 805 and/or the second UE 810 may correspond to one or more UEs described elsewhere herein. As further shown, the first link may be a direct link between the first UE 805 and the second UE 810, and the second link may be an indirect link between the first UE 805 and the second UE 810 via a first base station 815 and a second base station 820. The first base station 815 and/or the second base station 820 may correspond to one or more base stations described elsewhere herein.

In example 800, the first UE 805 and the second UE 810 are connected to different base stations. For example, the first UE 805 is connected to the first base station 815, and the second UE 810 is connected to the second base station 820. In this case, the first UE 805 may transmit the BFRR to the first base station 815 via the second link, the first base station 815 may relay the BFRR to the second base station 820, and the second base station 820 may relay the BFRR to the second UE 810. The first base station 815 and the second base station 820 may be connected via a wireless connection (e.g., wireless backhaul), a wired connection, or a combination of wireless and wired connections.

As shown by reference number 825, the first UE 805 may detect a beam failure of the first link between the first UE 805 and the second UE 810, in a similar manner as described above in connection with FIG. 6.

As shown by reference number 830, the first UE 805 may transmit a BFRR, indicating the beam failure of the first link, via a second link between the first UE 805 and the first base station 815, in a similar manner as described above in connection with FIG. 7. As shown by reference number 835, the first base station 815 may relay the BFRR to the second base station 820. In some aspects, the first UE 805 may include, in the BFRR, a UE identifier that identifies the second UE 810, a cell identifier that identifies the cell to which the second UE 810 is connected, and/or the like. The first base station 815 may use the UE identifier and/or the cell identifier to identify the second base station 820 to which the second UE 810 is connected. Additionally, or alternatively, the first base station 815 may transmit the BFRR to one or more neighbor cells of the first base station 815 without identifying the second base station 820 to which the second UE 810 is connected. As shown by reference number 840, the second base station 820 may relay the BFRR to the second UE 810 (e.g., using a UE identifier of the second UE 810).

As shown by reference number 845, upon receiving the BFRR relayed by the first base station 815 and the second base station 820, the second UE 810 may initiate a beam failure recovery procedure to select one or more beams for communication between the first UE 805 and the second UE 810, in a similar manner as described above in connection with FIG. 7. As shown by reference number 850, the first UE 805 may perform a beam failure recovery procedure to select one or more beams for communication between the first UE 805 and the second UE 810, in a similar manner as described above in connection with FIG. 7.

As shown by reference number 855, the first UE 805 and the second UE 810 may recover a failed link, in a similar manner as described above in connection with FIG. 7. By using the second link of the first UE 805 to assist with beam failure recovery when the first link of the first UE 805 fails, resources of the first UE 805 and/or the second UE 810 may be conserved, network resources may be conserved, and communication delays may be reduced as compared to a beam failure recovery procedure that does not use the second link to assist with beam failure recovery.

As indicated above, FIG. 8 is provided merely as an example. Other examples are possible and may differ from what was described with regard to FIG. 8.

Figure 9:
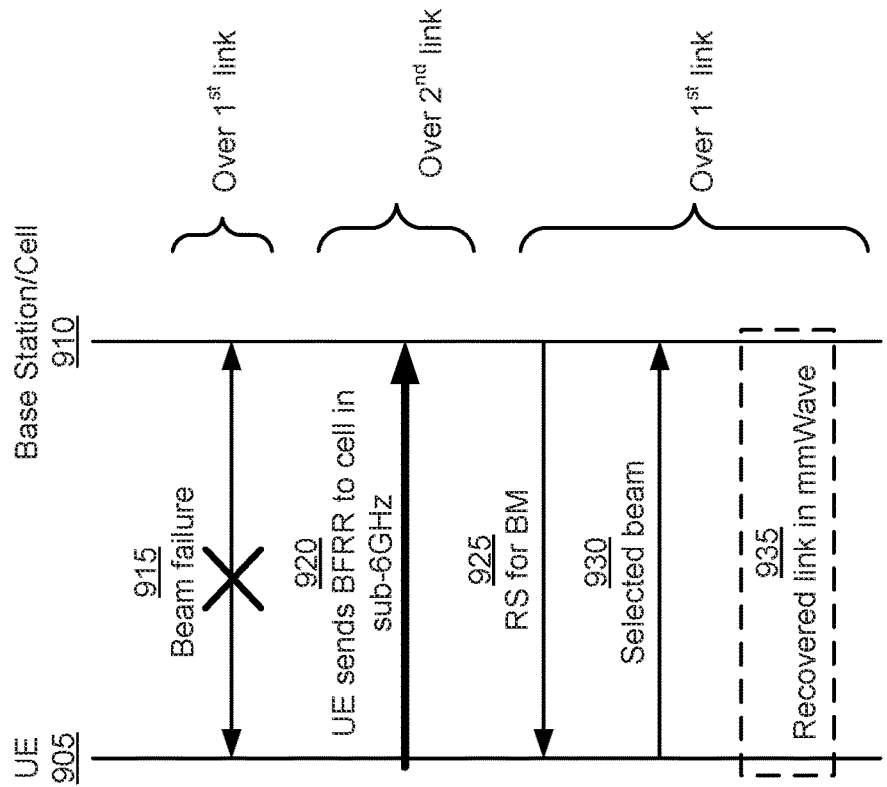

FIG. 9 is a diagram illustrating another example 900 of using a second link for beam failure recovery of a first link, in accordance with various aspects of the present disclosure.

As shown in FIG. 9, the first apparatus may be a UE 905, and the second apparatus may be a base station 910. The UE 905 may correspond to one or more UEs described elsewhere herein. The base station 910 may correspond to one or more base stations described elsewhere herein. As further shown, the first link may be a direct link between the UE 905 and the base station 910, and the second link may also be a direct link between the UE 905 and the base station 910. In some aspects, the first link may use a millimeter wave frequency band, and the second link may use a sub-6 GHz frequency band.

As shown by reference number 915, the UE 905 may detect a beam failure of the first link between the UE 905 and the base station 910, in a similar manner as described above in connection with FIG. 6.

As shown by reference number 920, the UE 905 may transmit a BFRR, indicating the beam failure of the first link, via the second link between the UE 905 and the base station 910, in a similar manner as described above in connection with FIG. 7.

As shown by reference number 925, upon receiving the BFRR from the UE 905, the base station 910 may initiate a beam failure recovery procedure to select one or more beams for communication between the UE 905 and the base station 910, in a similar manner as described above in connection with FIG. 7. As shown by reference number 930, the UE 905 may perform a beam failure recovery procedure to select one or more beams for communication between the UE 905 and the base station 910, in a similar manner as described above in connection with FIG. 7.

As shown by reference number 935, the UE 905 and the base station 910 may recover a failed link, in a similar manner as described above in connection with FIG. 7. By using the second link of the UE 905 to assist with beam failure recovery when the first link of the UE 905 fails, resources of the UE 905 and/or the base station 910 may be conserved, network resources may be conserved, and communication delays may be reduced as compared to a beam failure recovery procedure that does not use the second link to assist with beam failure recovery.

As indicated above, FIG. 9 is provided merely as an example. Other examples are possible and may differ from what was described with regard to FIG. 9.

Figure 10:
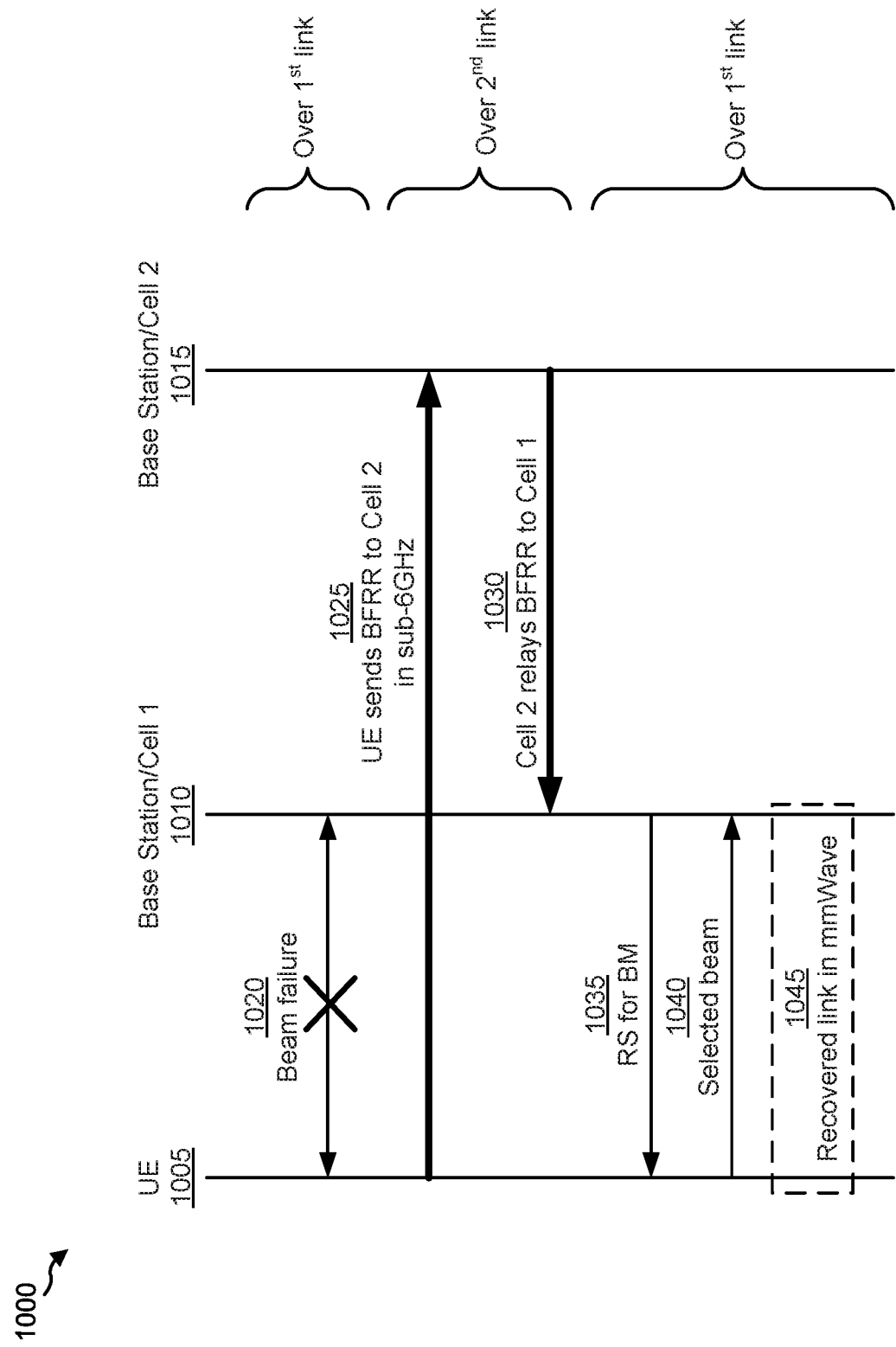

FIG. 10 is a diagram illustrating another example 1000 of using a second link for beam failure recovery of a first link, in accordance with various aspects of the present disclosure.

As shown in FIG. 10, the first apparatus may be a UE 1005, and the second apparatus may be a first base station 1010. The UE 1005 may correspond to one or more UEs described elsewhere herein, and the first base station 1010 may correspond to one or more base stations described elsewhere herein. As further shown, the first link may be a direct link between the UE 1005 and the first base station 1010, and the second link may be an indirect link between the UE 1005 and the first base station 1010 via a second base station 1015. The second base station 1015 may correspond to one or more base stations described elsewhere herein. The first base station 1010 and the second base station 1015 may be connected via a wireless connection (e.g., wireless backhaul), a wired connection, or a combination of wireless and wired connections. In some aspects, the first link may use a millimeter wave frequency band, and the second link may use a sub-6 GHz frequency band.

As shown by reference number 1020, the UE 1005 may detect a beam failure of the first link between the UE 1005 and the first base station 1010, in a similar manner as described above in connection with FIG. 6.

As shown by reference number 1025, the UE 1005 may transmit a BFRR, indicating the beam failure of the first link, via a second link between the UE 1005 and the second base station 1015, in a similar manner as described above in connection with FIG. 7.

As shown by reference number 1030, the second base station 1015 may relay the BFRR to the first base station 1010. In some aspects, the UE 1005 may include, in the BFRR, a UE identifier that identifies the UE 1005, a cell identifier that identifies the first base station 1010, and/or the like. The second base station 1015 may use the UE identifier and/or the cell identifier to identify the first base station 1010.

As shown by reference number 1035, upon receiving the BFRR relayed by the second base station 1015, the first base station 1010 may initiate a beam failure recovery procedure to select one or more beams for communication between the UE 1005 and the first base station 1010, in a similar manner as described above in connection with FIG. 7. As shown by reference number 1040, the UE 1005 may perform a beam failure recovery procedure to select one or more beams for communication between the UE 1005 and the first base station 1010, in a similar manner as described above in connection with FIG. 7.

As shown by reference number 1045, the UE 1005 and the first base station 1010 may recover a failed link, in a similar manner as described above in connection with FIG. 7. By using the second link of the UE 1005 to assist with beam failure recovery when the first link of the UE 1005 fails, resources of the UE 1005 and/or the first base station 1010 may be conserved, network resources may be conserved, and communication delays may be reduced as compared to a beam failure recovery procedure that does not use the second link to assist with beam failure recovery.

As indicated above, FIG. 10 is provided merely as an example. Other examples are possible and may differ from what was described with regard to FIG. 10.

Figure 11:
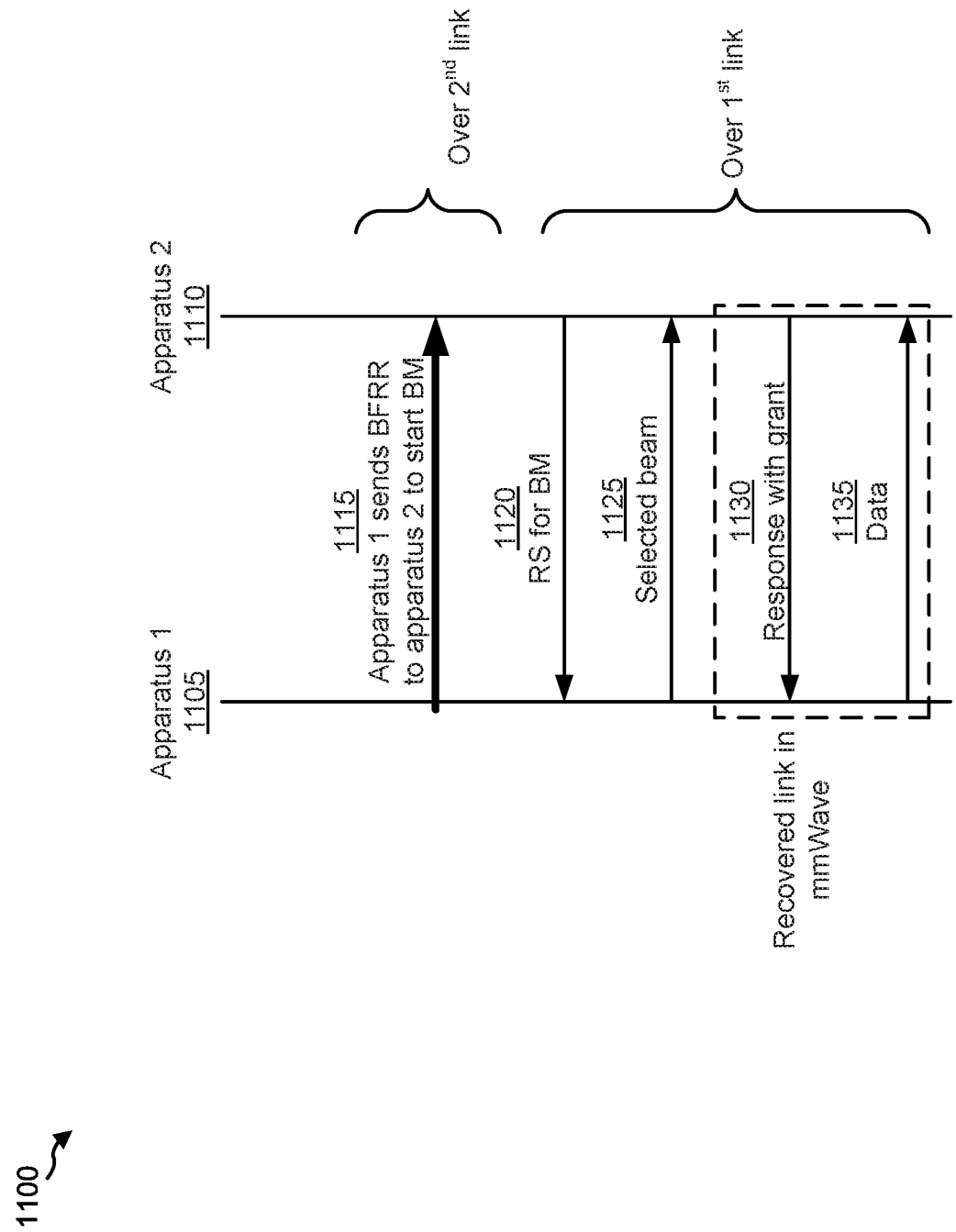

FIG. 11 is a diagram illustrating another example 1100 of using a second link for beam failure recovery of a first link, in accordance with various aspects of the present disclosure.

As shown in FIG. 11, a first apparatus 1105 (e.g., a UE, a base station, and/or the like) may communicate with a second apparatus 1110 (e.g., a UE, a base station, and/or the like) via a first link (e.g., a direct link) and a second link (e.g., a direct link or an indirect link), as described elsewhere herein.

As shown by reference number 1115, upon detecting a beam failure of the first link, the first apparatus 1105 may transmit a BFRR, indicating the beam failure of the first link, via a second link of the first apparatus 1105. The second apparatus 1110 may receive the BFRR via the second link.

As shown by reference number 1120, upon receiving the BFRR via the second link, the second apparatus 1110 may initiate a beam failure recovery procedure to select one or more beams for communication between the first apparatus 1105 and the second apparatus 1110. As shown, the BFRR may trigger the second apparatus 1110 to transmit multiple reference signals (e.g., shown as RS) on multiple beams according to a beam management procedure (e.g., shown as BM), which may also be referred to as beam refinement, a beam failure recovery procedure, and/or the like. For example, the second apparatus 1110 may perform beam sweeping by transmitting reference signals on multiple beams (e.g., all configured beams, a subset of all configured beams, and/or the like).

In some aspects, the first apparatus 1105 and/or the second apparatus 1110 may communicate a beam management configuration via the second link. For example, the first apparatus 1105 may indicate the beam management configuration to the second apparatus 1110 via the second link. In some aspects, the first apparatus 1105 may include the beam management configuration in the BFRR. Additionally, or alternatively, the second apparatus 1110 may indicate the beam management configuration to the first apparatus 1105 via the second link after receiving the BFRR from the first apparatus 1105. In some aspects, the beam management configuration may be predetermined, and may not be communicated between the first apparatus 1105 and the second apparatus 1110 to conserve network resources.

The beam management configuration may indicate, for example, a time (e.g., a point in time, a time period, a time window, and/or the like) associated with the beam failure recovery procedure (e.g., a time for transmission of reference signals on multiple beams). For example, the beam management configuration may indicate a start time for the beam failure recovery procedure, a time window during which the beam management procedure is to occur, and/or the like. Additionally, or alternatively, the beam management configuration may indicate one or more resources to be used for performing the beam failure recovery procedure. For example, the beam management configuration may indicate one or more resource blocks in which one or more reference signals are to be transmitted (e.g., a time resource and/or a frequency resource for transmission of reference signals), a beam on which an initial reference signal is to be transmitted, a sequence of beams on which reference signals are to be transmitted, and/or the like. Additionally, or alternatively, the beam management configuration may indicate one or more resource blocks to be used for other communications associated with beam failure recovery, such as one or more resource blocks to be used to indicate a selected beam.

As shown by reference number 1125, the first apparatus 1105 may perform a beam failure recovery procedure to select one or more beams for communication between the first apparatus 1105 and the second apparatus 1110. For example, the first apparatus 1105 may measure multiple reference signals received from the second apparatus 1110 on multiple beams, and may compare the reference signals to identify a beam to be selected as an active beam for communications between the first apparatus 1105 and the second apparatus 1110. For example, the first apparatus 1105 may select a beam associated with the best signal power, the best signal quality, the best signal strength, and/or the like, as compared to other beams. As shown, the first apparatus 1105 may indicate the selected beam to the second apparatus 1110 (e.g., by transmitting a beam index that identifies the selected beam).

As shown by reference numbers 1130 and 1135, the first apparatus 1105 and the second apparatus 1110 may recover a failed link (e.g., the failed first link, which is a D2D link). For example, upon receiving an indication of the selected beam, the second apparatus 1110 may transmit a grant that indicates one or more resources of the selected beam to be used for transmission of data by the first apparatus 1105. The first apparatus 1105 may transmit the data to the second apparatus 1110 using the indicated resource(s) of the selected beam.

By using the second link of the first apparatus 1105 to assist with beam failure recovery when the first link between the first apparatus 1105 and the second apparatus 1110 fails, resources of the first apparatus 1105 and/or the second apparatus 1110 may be conserved, network resources may be conserved, and communication delays may be reduced as compared to a beam failure recovery procedure that does not use the second link to assist with beam failure recovery.

As indicated above, FIG. 11 is provided merely as an example. Other examples are possible and may differ from what was described with regard to FIG. 11.

Figure 12:
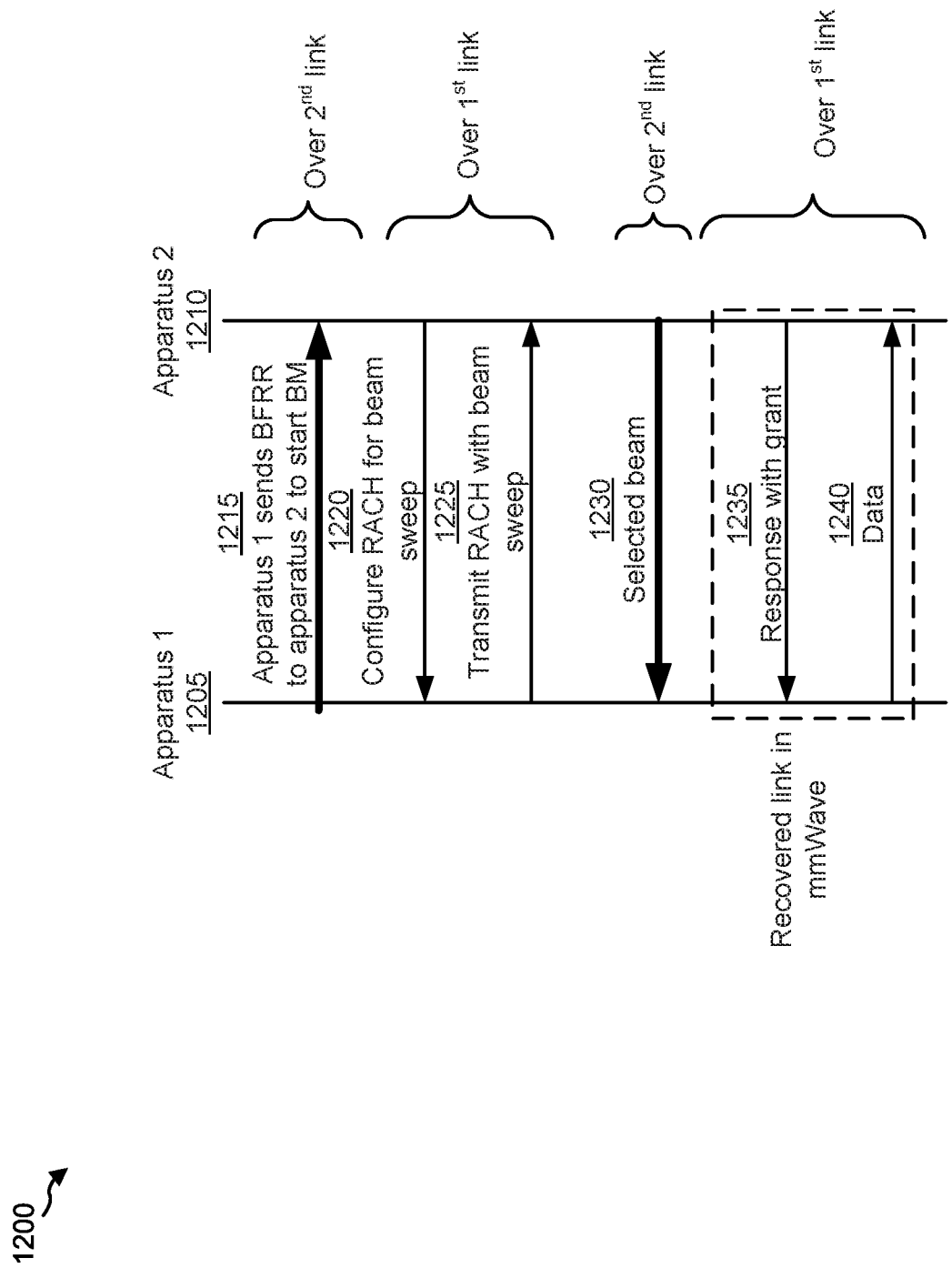

FIG. 12 is a diagram illustrating another example 1200 of using a second link for beam failure recovery of a first link, in accordance with various aspects of the present disclosure.

As shown in FIG. 12, a first apparatus 1205 (e.g., a UE, a base station, and/or the like) may communicate with a second apparatus 1210 (e.g., a UE, a base station, and/or the like) via a first link (e.g., a direct link) and a second link (e.g., a direct link or an indirect link), as described elsewhere herein.

As shown by reference number 1215, upon detecting a beam failure of the first link, the first apparatus 1205 may transmit a BFRR, indicating the beam failure of the first link, via a second link of the first apparatus 1205, as described elsewhere herein. The second apparatus 1210 may receive the BFRR via the second link.

As shown by reference number 1220, upon receiving the BFRR via the second link, the second apparatus 1210 may initiate a beam failure recovery procedure to select one or more beams for communication between the first apparatus 1205 and the second apparatus 1210. As shown, the BFRR may trigger the second apparatus 1210 to configure an on-demand random access channel (RACH) procedure for a beam sweep. Using the RACH procedure, the second apparatus 1210 may configure one or more resources (e.g., resource blocks, time resources, frequency resources, beams, and/or the like) on which the second apparatus 1210 will be configured to measure reference signals transmitted by the first apparatus 1205. The second apparatus 1210 may indicate, to the first apparatus 1205, the one or more resources that the first apparatus 1205 is to use for transmission of reference signals.

As shown by reference number 1225, the first apparatus 1205 may perform a beam failure recovery procedure by transmitting the reference signals using the one or more resources indicated by the second apparatus 1210. For example, the first apparatus 1205 may transmit multiple reference signals on multiple beams (e.g., via a beam sweep). In some aspects, the first apparatus 1205 may sweep reference signals across multiple transmit (Tx) beams in a RACH slot, and the second apparatus 1210 may use a fixed receive (Rx) beam to receive the reference signals.

As shown by reference number 1230, the second apparatus 1210 may indicate one or more beams to be used for communication between the first apparatus 1205 and the second apparatus 1210. For example, the second apparatus 1210 may measure multiple reference signals received from the first apparatus 1205 on multiple beams, and may compare the reference signals to identify a pair of beams to be selected as an active beam pair for communications between the first apparatus 1205 and the second apparatus 1210. For example, the second apparatus 1210 may select a beam pair associated with the best signal power, the best signal quality, the best signal strength, and/or the like, as compared to other beam pairs. As shown, the second apparatus 1210 may indicate the selected beam to the first apparatus 1205 via the second link (e.g., by transmitting a beam index that identifies the selected beam to be used by the first apparatus 1205).

As shown by reference numbers 1235 and 1240, the first apparatus 1205 and the second apparatus 1210 may recover a failed link. For example, upon selecting a beam and indicating the selected beam to the first apparatus 1205, the second apparatus 1210 may transmit a grant that indicates one or more resources of the selected beam to be used for transmission of data by the first apparatus 1205. In some aspects, the second apparatus 1210 may indicate a timing of the grant (e.g., in association with transmitting the selected beam to the first apparatus 1205), and may transmit the grant according to the timing. The first apparatus 1205 may transmit the data to the second apparatus 1210 using the indicated resource(s) of the selected beam.

By using the second link of the first apparatus 1205 to assist with beam failure recovery when the first link between the first apparatus 1205 and the second apparatus 1210 fails, resources of the first apparatus 1205 and/or the second apparatus 1210 may be conserved, network resources may be conserved, and communication delays may be reduced as compared to a beam failure recovery procedure that does not use the second link to assist with beam failure recovery.

As indicated above, FIG. 12 is provided merely as an example. Other examples are possible and may differ from what was described with regard to FIG. 12.

Figure 13:
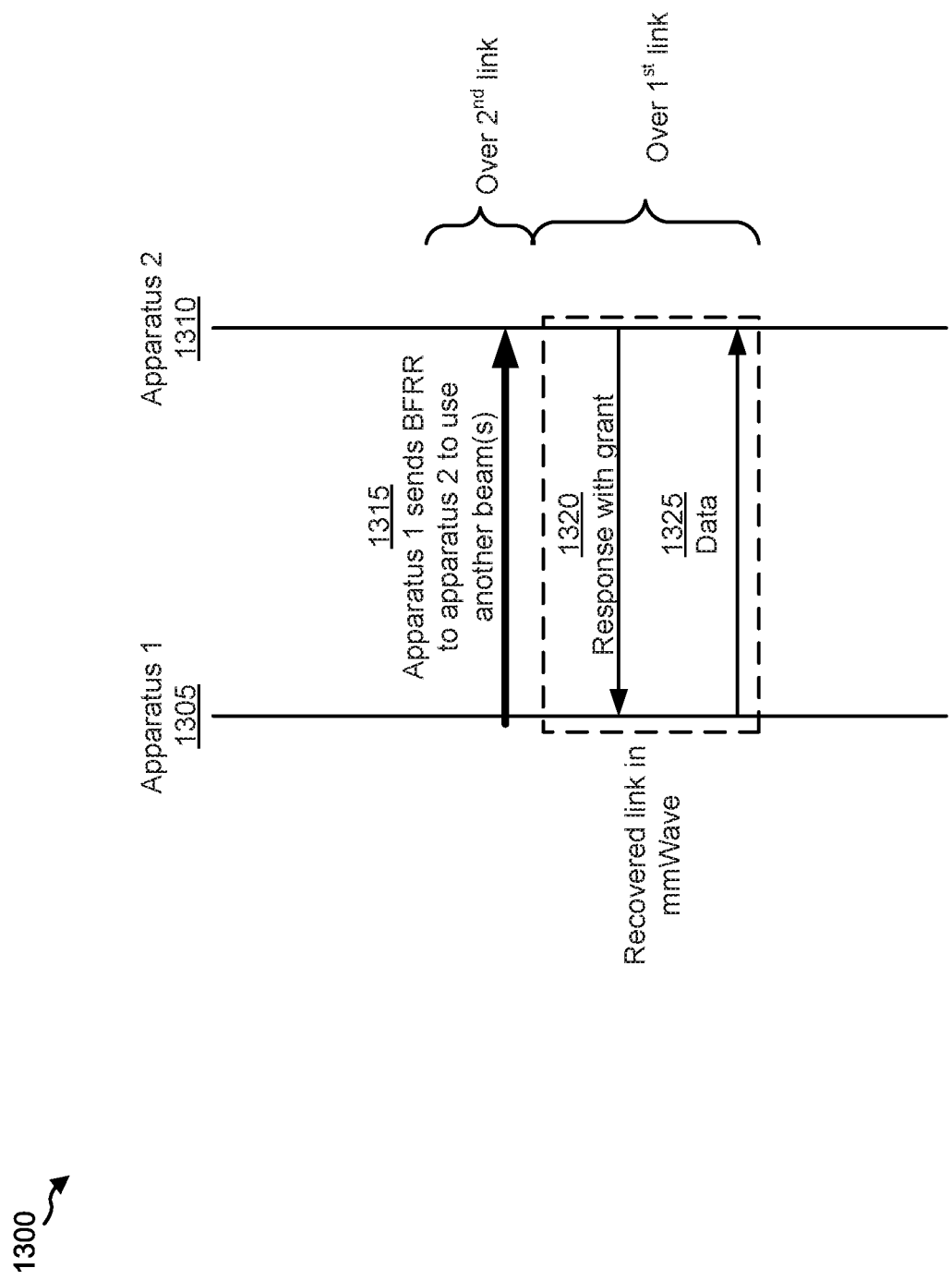

FIG. 13 is a diagram illustrating another example 1300 of using a second link for beam failure recovery of a first link, in accordance with various aspects of the present disclosure.

As shown in FIG. 13, a first apparatus 1305 (e.g., a UE, a base station, and/or the like) may communicate with a second apparatus 1310 (e.g., a UE, a base station, and/or the like) via a first link (e.g., a direct link) and a second link (e.g., a direct link or an indirect link), as described elsewhere herein.

As shown by reference number 1315, upon detecting a beam failure of the first link, the first apparatus 1305 may transmit a BFRR, indicating the beam failure of the first link, via a second link of the first apparatus 1305, as described elsewhere herein. The second apparatus 1310 may receive the BFRR via the second link.

In some aspects, the BFRR may indicate one or more beams to be used for communication between the first apparatus 1305 and the second apparatus 1310 (e.g., to recover from the beam failure of the first link). For example, the BFRR may include a beam index for the beam to be used as the active beam. In this case, the first apparatus 1305 may use one or more previously measured reference signals (e.g., channel state information (CSI)-RS) on one or more beams to select a beam, rather than triggering transmission of additional reference signals for selected of the beam, thereby conserving resources of the first apparatus 1305, resources of the second apparatus 1310, and network resources. In some aspects, the BFRR may include a list of beam indices, based on which the second apparatus 1310 can try in sequence to send data to the first apparatus 1305.

In some aspects, the first apparatus 1305 and/or the second apparatus 1310 may communicate, via the second link, a timing to be used for beam failure recovery (e.g., a timing for transmission of a grant via the selected beam). For example, the first apparatus 1305 may indicate the timing to the second apparatus 1310 via the second link. In some aspects, the first apparatus 1305 may indicate the timing in the BFRR. Additionally, or alternatively, the second apparatus 1310 may indicate the timing to the first apparatus 1305 via the second link after receiving the BFRR from the first apparatus 1305. In some aspects, the timing may be predetermined, and may not be communicated between the first apparatus 1305 and the second apparatus 1310, thereby conserving network resources.

As shown by reference numbers 1320 and 1325, the first apparatus 1305 and the second apparatus 1310 may recover a failed link. For example, upon receiving an indication of the selected beam from the first apparatus 1305 (e.g., in the BFRR), the second apparatus 1310 may transmit a grant that indicates one or more resources of the selected beam to be used for transmission of data by the first apparatus 1305. The first apparatus 1305 may transmit the data to the second apparatus 1310 using the indicated resource(s) of the selected beam. In this way, resources of the first apparatus 1305 and/or the second apparatus 1310 may be conserved, network resources may be conserved, communication delays may be reduced, and/or the like.

As indicated above, FIG. 13 is provided merely as an example. Other examples are possible and may differ from what was described with regard to FIG. 13.

Figure 14:
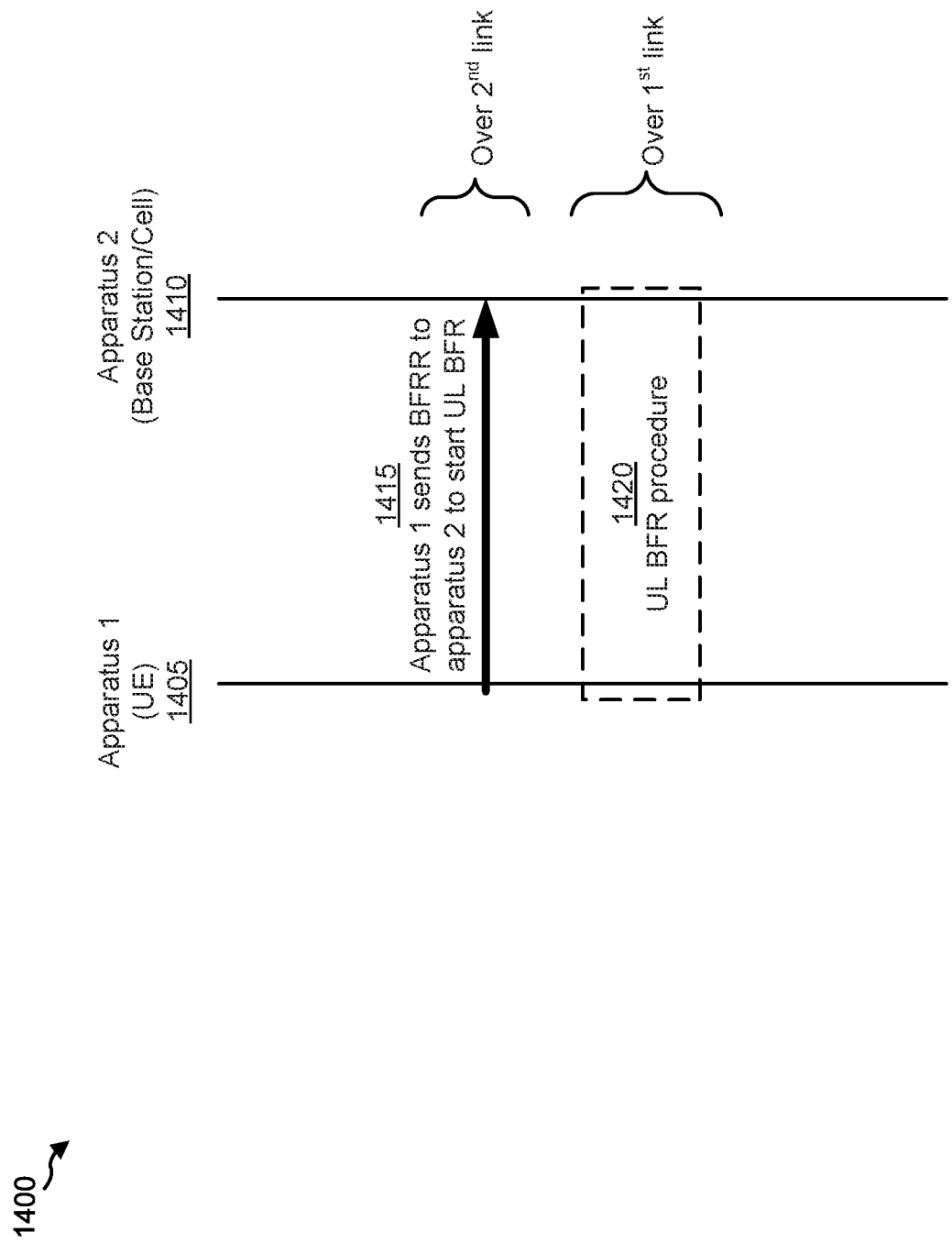

FIG. 14 is a diagram illustrating another example 1400 of using a second link for beam failure recovery of a first link, in accordance with various aspects of the present disclosure.

As shown in FIG. 14, a first apparatus 1405 (e.g., shown as a UE) may communicate with a second apparatus 1410 (e.g., shown as a base station) via a first link (e.g., a direct link) and a second link (e.g., a direct link or an indirect link), as described elsewhere herein. Example 1400 is an example where the first apparatus 1405 detects a beam failure of an uplink control beam (e.g., a failure of all or a subset of uplink control beams), but where one or more downlink control beams do not experience a failure. For example, the uplink control beam(s) may fail due to a maximum permissible exposure (MPE) issue, an imbalanced power issue, uplink interference, and/or the like.

As shown by reference number 1415, upon detecting an uplink beam failure of the first link (e.g., and determining that one or more downlink beams have not failed on the first link), the first apparatus 1405 may transmit a BFRR, indicating the uplink beam failure of the first link, via a second link of the first apparatus 1405, as described elsewhere herein. The second apparatus 1410 may receive the BFRR via the second link. In some aspects, the BFRR may indicate that the beam failure is an uplink beam failure, and/or may indicate that the beam failure recovery procedure is to be performed for recovery of an uplink beam.

As shown by reference number 1420, the first apparatus 1405 and the second apparatus 1410 may recover a failed link by performing an uplink beam failure recovery procedure. In this case, one or more beam failure recovery procedures described elsewhere herein may be performed to select a beam (e.g., a beam pair link). In some aspects, the beam failure recovery procedure may be performed to select a new separate beam pair for uplink communications, which is different from the beam pair for downlink communications. In some aspects, the beam failure recovery procedure may be performed to select a new common beam pair for both uplink and downlink communications. Thus, one or more selected beams determined based at least in part on performing the beam failure recovery procedure may include only a separate beam pair for uplink communications, or a common beam pair for both uplink and downlink communications. In this way, resources of the first apparatus 1405 and/or the second apparatus 1410 may be conserved, network resources may be conserved, communication delays may be reduced, and/or the like. Similarly, if only the downlink beams fail, the beam failure recovery procedure can identify a new separate beam pair for downlink communications, or a new common beam pair for both uplink and downlink communications. The corresponding training and/or reconfiguration may be scheduled and/or signaled via the second link.

As indicated above, FIG. 14 is provided merely as an example. Other examples are possible and may differ from what was described with regard to FIG. 14.

Figure 15:
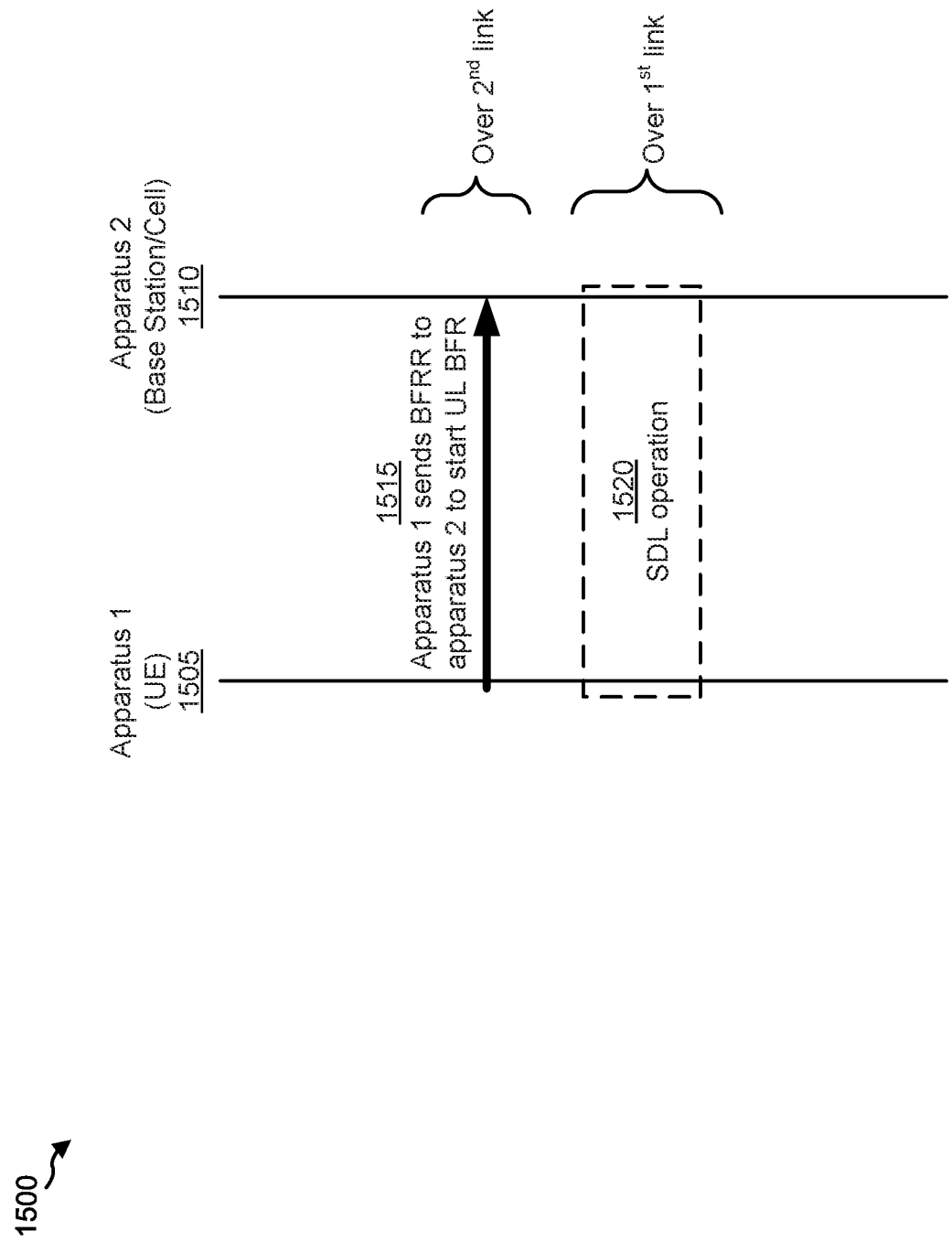

FIG. 15 is a diagram illustrating another example 1500 of using a second link for beam failure recovery of a first link, in accordance with various aspects of the present disclosure.

As shown in FIG. 15, a first apparatus 1505 (e.g., shown as a UE) may communicate with a second apparatus 1510 (e.g., shown as a base station) via a first link (e.g., a direct link) and a second link (e.g., a direct link or an indirect link), as described elsewhere herein. Example 1500 is another example where the first apparatus 1505 detects a beam failure of an uplink control beam (e.g., a failure of all or a subset of uplink control beams), but where one or more downlink control beams do not experience a failure. For example, the uplink control beam(s) may fail due to a maximum permissible exposure (MPE) issue, an imbalanced power issue, uplink interference, and/or the like.

As shown by reference number 1515, upon detecting an uplink beam failure of the first link (e.g., and determining that one or more downlink beams have not failed on the first link), the first apparatus 1505 may transmit a BFRR, indicating the uplink beam failure of the first link, via a second link of the first apparatus 1505, as described elsewhere herein. The second apparatus 1510 may receive the BFRR via the second link. In some aspects, the BFRR may indicate that the beam failure is an uplink beam failure, may indicate that the beam failure recovery procedure is to be performed for recovery of an uplink beam, may indicate that the first link is to be used for downlink communications and the second link or a third link are to be used for uplink communications, and/or the like. For example, the BFRR may instruct the second apparatus 1510 to initiate a supplemental downlink mode where the first link is used for downlink transmissions (e.g., because the downlink beam(s) have not failed on the first link) and a link other than the first link is used for uplink transmissions (e.g., because the uplink beam(s) have failed on the first link). In some aspects, if only the downlink beams fail, the first link can still be used for uplink communications, while downlink communication can occur on the second link or the third link. In some aspects, this reconfiguration may be signaled via the second link.

As shown by reference number 1520, the first apparatus 1505 and the second apparatus 1510 may recover a failed link by performing a supplemental downlink (SDL) operation. In this case, the first apparatus 1505 and the second apparatus 1510 may use the first link only for downlink communications transmitted from the second apparatus 1510 to the first apparatus 1505. Additionally, or alternatively, the first apparatus 1505 and the second apparatus 1510 may use the second link (e.g., the link via which the BFRR was transmitted) or a third link (e.g., that uses a sub-6 GHz frequency band) for uplink communications transmitted from the first apparatus 1505 to the second apparatus 1510. In some aspects, an indication of whether to use the second link or the third link may be communicated by the first apparatus 1505 (e.g., in the BFRR) and/or the second apparatus 1510 via the second link. In this way, resources of the first apparatus 1505 and/or the second apparatus 1510 may be conserved, network resources may be conserved, communication delays may be reduced, and/or the like.

As indicated above, FIG. 15 is provided merely as an example. Other examples are possible and may differ from what was described with regard to FIG. 15.

Figure 16:
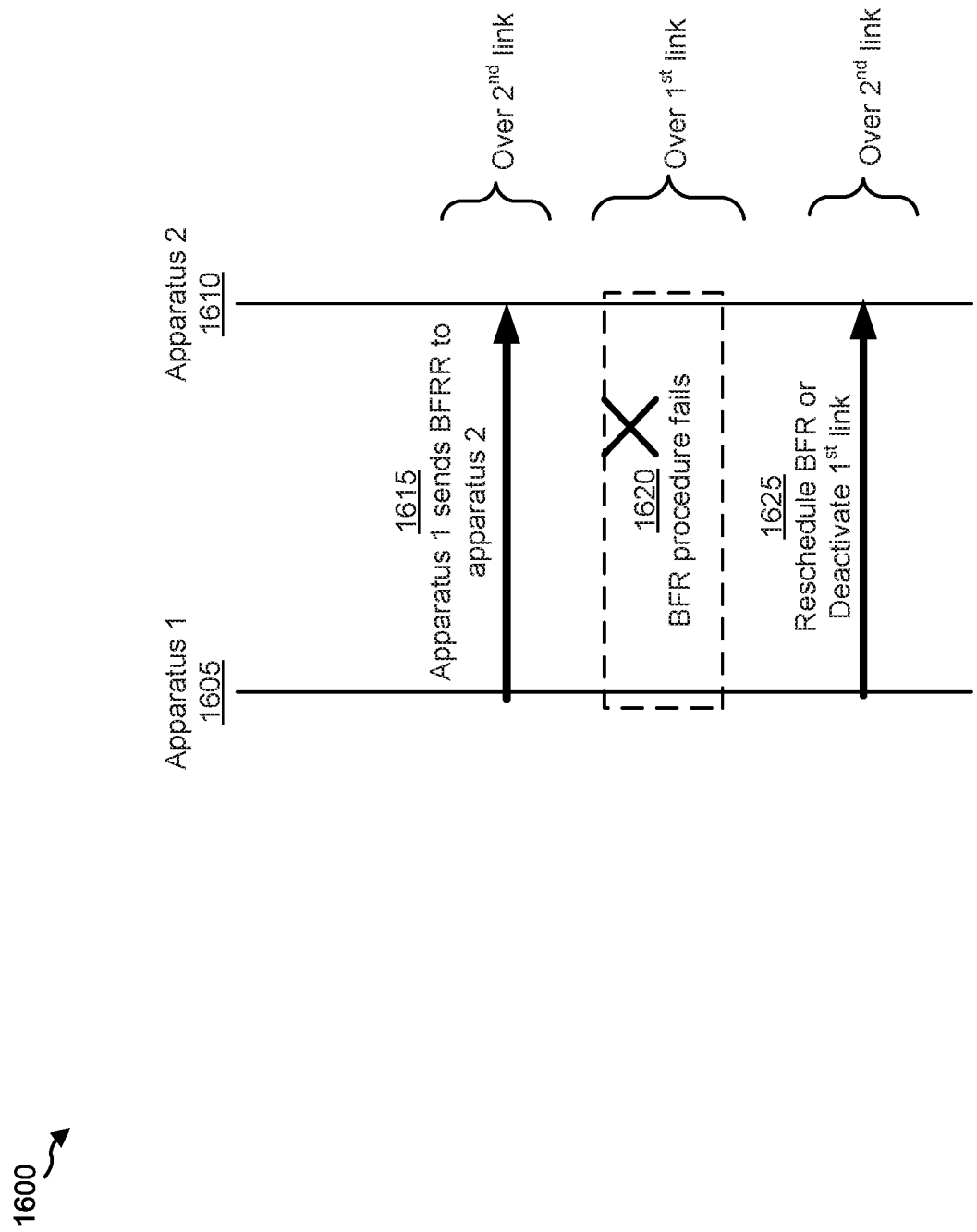

FIG. 16 is a diagram illustrating another example 1600 of using a second link for beam failure recovery of a first link, in accordance with various aspects of the present disclosure.

As shown in FIG. 16, a first apparatus 1605 (e.g., a UE, a base station, and/or the like) may communicate with a second apparatus 1610 (e.g., a UE, a base station, and/or the like) via a first link (e.g., a direct link) and a second link (e.g., a direct link or an indirect link), as described elsewhere herein.

As shown by reference number 1615, upon detecting a beam failure of the first link, the first apparatus 1605 may transmit a BFRR, indicating the beam failure of the first link, via a second link of the first apparatus 1605, as described elsewhere herein.

As shown by reference number 1620, in some aspects, a beam failure recovery procedure, triggered by transmission of the BFRR, may fail. For example, the second apparatus 1610 may fail to receive the BFRR (e.g., after a single transmission and/or one or more retransmissions), the first apparatus 1605 may not receive a response to the BFRR from the second apparatus 1610, the first apparatus 1605 may fail to select a beam (e.g., due to not detecting any available beams with a beam parameter that satisfies a condition), and/or the like.

As shown by reference number 1625, based at least in part on determining that the beam failure recovery procedure has failed, the first apparatus 1605 may schedule a subsequent beam failure recovery procedure (e.g., may reschedule the BFR procedure), may deactivate the first link, and/or the like. In some aspects, the first apparatus 1605 may schedule a subsequent beam failure recovery procedure, and may indicate a timing for the subsequent beam failure recovery procedure to the second apparatus 1610 via the second link. Additionally, or alternatively, the first apparatus 1605 may deactivate the first link. In some aspects, the first apparatus 1605 may transmit, via the second link, an indication that the first link is to be deactivated. Additionally, or alternatively, the second apparatus 1610 may transmit, via the second link, an indication that the first link is to be deactivated. At a later time (e.g., due to expiration of a timer, due to determining that beam conditions have improved, and/or the like), the first apparatus 1605 and/or the second apparatus 1610 may transmit, via the second link, an indication that the first link is to be reactivated. In this way, resources of the first apparatus 1605 and/or the second apparatus 1610 may be conserved, network resources may be conserved, communication delays may be reduced, and/or the like.

As indicated above, FIG. 16 is provided merely as an example. Other examples are possible and may differ from what was described with regard to FIG. 16.

Figure 17:
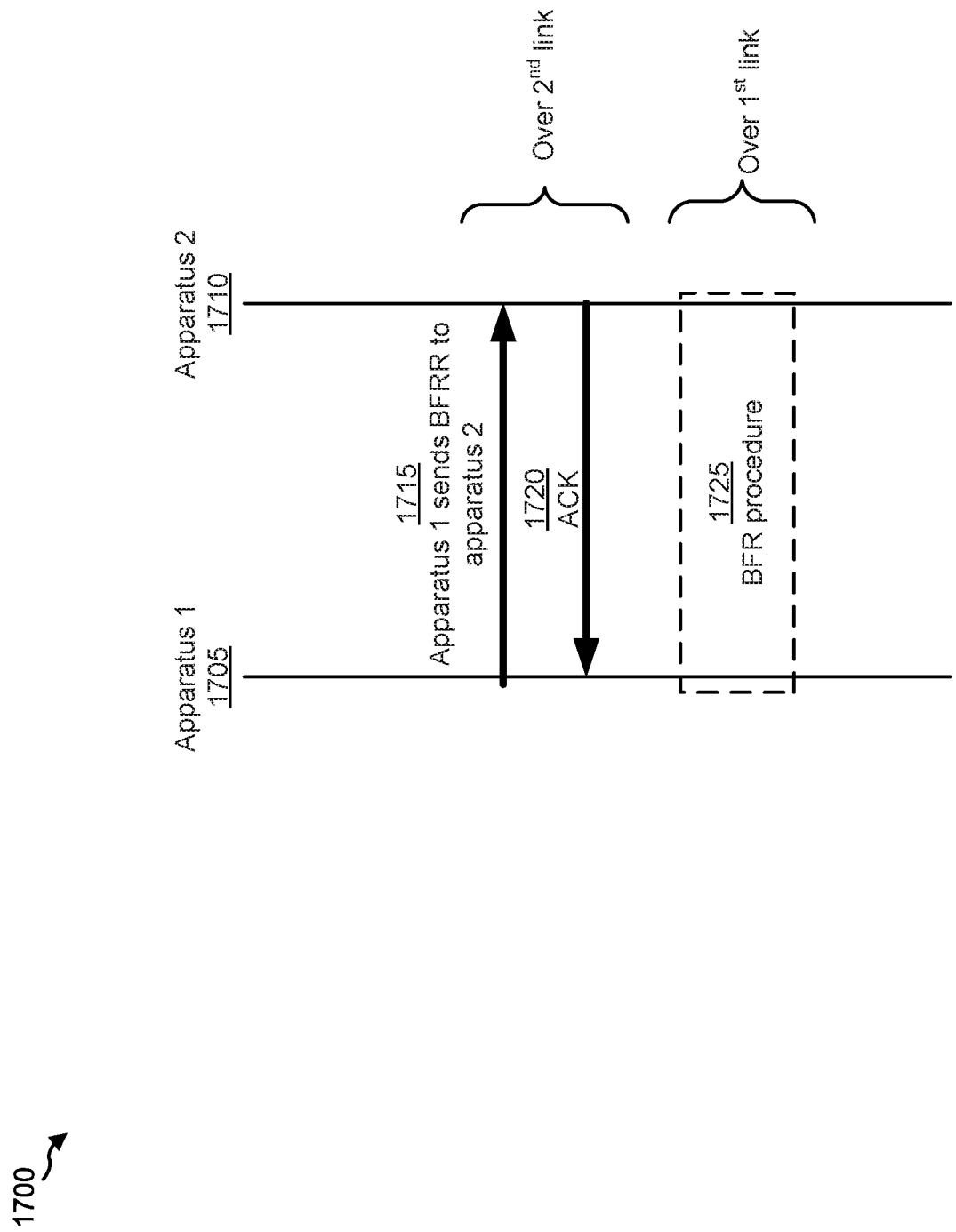

FIG. 17 is a diagram illustrating another example 1700 of using a second link for beam failure recovery of a first link, in accordance with various aspects of the present disclosure.

As shown in FIG. 17, a first apparatus 1705 (e.g., a UE, a base station, and/or the like) may communicate with a second apparatus 1710 (e.g., a UE, a base station, and/or the like) via a first link (e.g., a direct link) and a second link (e.g., a direct link or an indirect link), as described elsewhere herein.

As shown by reference number 1715, upon detecting a beam failure of the first link, the first apparatus 1705 may transmit a BFRR, indicating the beam failure of the first link, via a second link of the first apparatus 1705, as described elsewhere herein. The second apparatus 1710 may receive the BFRR via the second link.

As shown by reference number 1720, based at least in part on receiving the BFRR via the second link, the second apparatus 1710 may transmit an acknowledgement (ACK), via the second link, to the first apparatus 1705. In some aspects, the first apparatus 1705 may prepare for a beam failure recovery procedure and/or a data communication based at least in part on receiving the ACK (e.g., by reserving one or more resources). Additionally, or alternatively, if the first apparatus 1705 does not receive an ACK (e.g., within a specified time period), the first apparatus 1705 may retransmit the BFRR (e.g., for a predetermined number of retransmissions) and/or may enter a sleep mode (e.g., after retransmitting the BFRR a maximum number of times).

In some aspects, if the second apparatus 1710 fails to properly receive the BFRR, the second apparatus 1710 may transmit a negative acknowledgment (NACK). In this case, the first apparatus 1705 may retransmit the BFRR (e.g., for a predetermined number of retransmissions) and/or may enter a sleep mode (e.g., after retransmitting the BFRR a maximum number of times). In some aspects, the first apparatus 1705 and/or the second apparatus 1710 may transmit ACK/NACK feedback in connection with one or more other messages described herein (e.g., messages transmitted via the second link). In this way, the reliability of such messages may be improved.

As shown by reference number 1725, the first apparatus 1705 and the second apparatus 1710 may recover a failed link by performing a beam failure recovery procedure, as described in more detail elsewhere herein. In this way, resources of the first apparatus 1705 and/or the second apparatus 1710 may be conserved, network resources may be conserved, communication delays may be reduced, and/or the like.

As indicated above, FIG. 17 is provided merely as an example. Other examples are possible and may differ from what was described with regard to FIG. 17.

Figure 18:
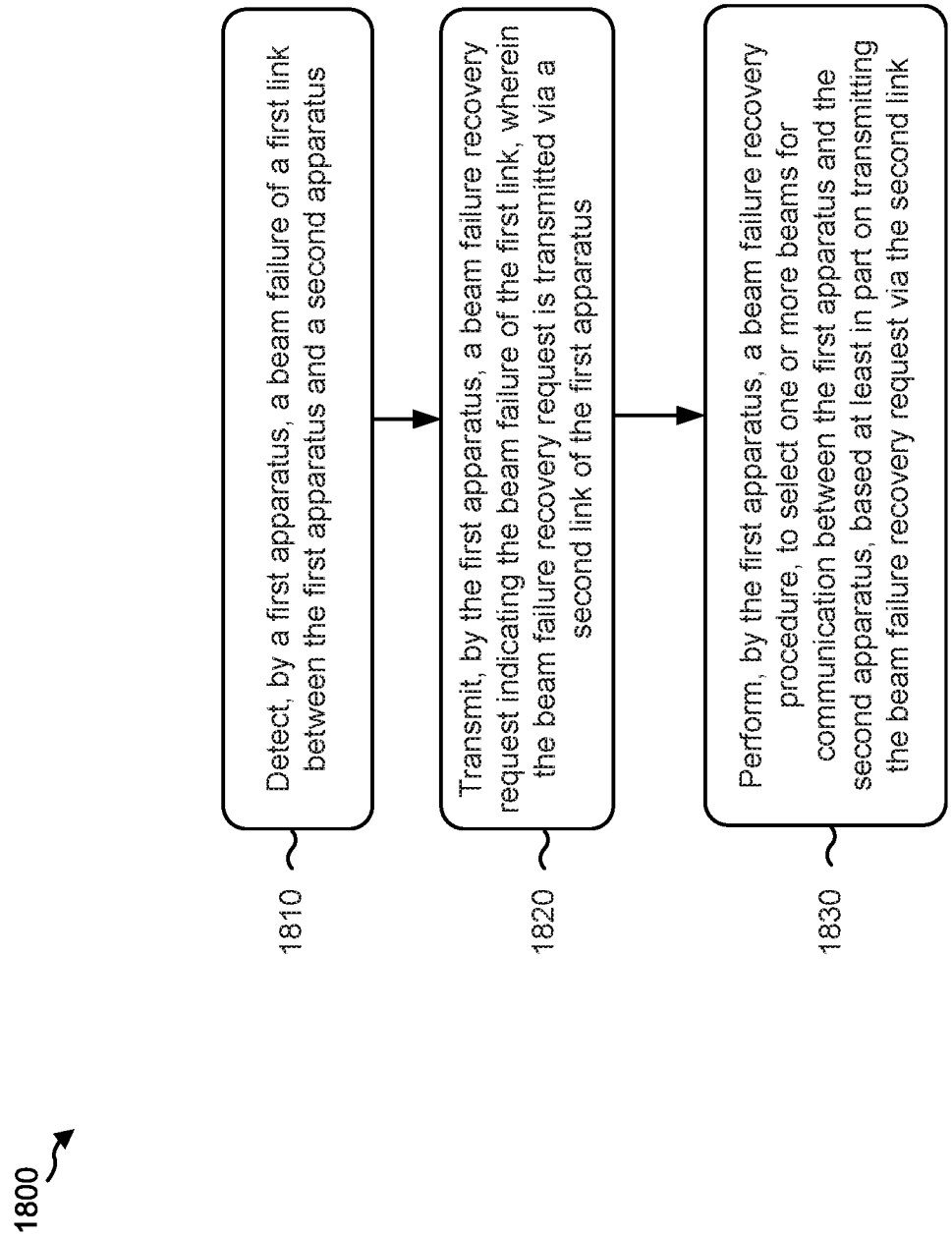
FIGS. 18 and 19 are diagrams illustrating example processes performed, for example, by an apparatus, in accordance with various aspects of the present disclosure.

FIG. 18 is a diagram illustrating an example process 1800 performed, for example, by an apparatus, in accordance with various aspects of the present disclosure. Example process 1800 is an example where an apparatus (e.g., a first apparatus, such as one or more UEs described herein, one or more base stations described herein, and/or the like) uses a second link for beam failure recovery of a first link.

As shown in FIG. 18, in some aspects, process 1800 may include detecting, by a first apparatus, a beam failure of a first link between the first apparatus and a second apparatus (block 1810). For example, the first apparatus may detect a beam failure of a first link between the first apparatus and a second apparatus, as described above in connection with FIGS. 6-17.

As further shown in FIG. 18, in some aspects, process 1800 may include transmitting, by the first apparatus, a beam failure recovery request indicating the beam failure of the first link, wherein the beam failure recovery request is transmitted via a second link of the first apparatus (block 1820). For example, the first apparatus may transmit, via a second link of the first apparatus, a beam failure recovery request indicating the beam failure of the first link, as described above in connection with FIGS. 6-17.

As further shown in FIG. 18, in some aspects, process 1800 may include performing, by the first apparatus, a beam failure recovery procedure, to select one or more beams for communication between the first apparatus and the second apparatus, based at least in part on transmitting the beam failure recovery request via the second link (block 1830).

For example, the first apparatus may perform a beam failure recovery procedure to select one or more beams for communication between the first apparatus and the second apparatus, as described above in connection with FIGS. 6-17. In some aspects, the first apparatus may perform the beam failure recovery procedure based at least in part on transmitting the beam failure recovery request via the second link.

In some aspects, the first link and the second link use a same frequency band. In some aspects, the frequency band is a millimeter wave frequency band. In some aspects, the first link uses a first frequency band and the second link uses a second frequency band. In some aspects, the first frequency band is a millimeter wave frequency band and the second frequency band is a sub-6 gigahertz frequency band.

In some aspects, the second link is an indirect link between the first apparatus and a third apparatus that relays the beam failure recovery request to the second apparatus. In some aspects, the second link is a direct link between the first apparatus and the second apparatus. In some aspects, the second link includes at least one of: a wireless link, a wired link, or some combination thereof.

In some aspects, the beam failure is a full failure of all serving control channels associated with the first apparatus. In some aspects, the beam failure is a partial failure of a subset of serving control channels associated with the first apparatus.

In some aspects, the first apparatus and the second apparatus are connected to a same base station. In some aspects, the beam failure recovery request is transmitted to the base station, via the second link, for relay to the second apparatus. In some aspects, the first link and the second link use a millimeter wave frequency band. In some aspects, the first link uses a millimeter wave frequency band and the second link uses a sub-6 gigahertz frequency band.

In some aspects, the first apparatus is connected to a first base station and the second apparatus is connected to a second base station. In some aspects, the beam failure recovery request is transmitted to the first base station, via the second link, for relay to the second apparatus via the second base station. In some aspects, the first base station and the second base station are connected via at least one of: a wireless connection, a wired connection, or some combination thereof.

In some aspects, the first link uses a millimeter wave frequency band and the second link is between the first apparatus and the second apparatus and uses a sub-6 gigahertz frequency band. In some aspects, the first apparatus is a user equipment and the second apparatus is a base station.

In some aspects, the first link uses a millimeter wave frequency band and the second link is between the first apparatus and a third apparatus and uses a sub-6 gigahertz frequency band. In some aspects, the beam failure recovery request is transmitted to the third apparatus for relay to the second apparatus. In some aspects, the first apparatus is a user equipment, the second apparatus is a first base station, and the third apparatus is a second base station.

In some aspects, the first apparatus is a first user equipment and the second apparatus is a second user equipment. In some aspects, the first apparatus is a user equipment and the second apparatus is a base station. In some aspects, the first apparatus is a first base station and the second apparatus is a second base station.

In some aspects, performing the beam failure recovery procedure comprises: measuring a plurality of reference signals received from the second apparatus on a plurality of beams, wherein the beam failure recovery request triggers transmission of the plurality of reference signals; and selecting the one or more beams from the plurality of beams based at least in part on measuring the plurality of reference signals. In some aspects, a beam management configuration, that indicates one or more resources associated with performing the beam failure recovery procedure, is communicated via the second link.

In some aspects, performing the beam failure recovery procedure comprises: receiving an indication of one or more resources to be used for transmission of a plurality of reference signals by the first apparatus; transmitting the plurality of reference signals using the one or more resources; and receiving an indication of the one or more beams to be used for communication between the first apparatus and the second apparatus based at least in part on transmitting the plurality of reference signals.

In some aspects, the beam failure recovery request indicates the one or more beams to be used for communication between the first apparatus and the second apparatus. In some aspects, the one or more beams include at least one of: an uplink beam, a downlink beam, or both an uplink beam and a downlink beam. In some aspects, the beam failure is an uplink beam failure. In some aspects, the beam failure recovery request indicates that the beam failure recovery procedure is to be performed for recovery of an uplink beam. In some aspects, the beam failure recovery request indicates that the second link or a third link is to be used for uplink communications.

In some aspects, a subsequent beam failure recovery procedure is to be scheduled or the first link is to be deactivated based at least in part on a determination that the beam failure recovery procedure has failed. In some aspects, acknowledgement/negative acknowledgement (ACK/NACK) feedback is to be received in connection with transmission of the beam failure recovery request.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
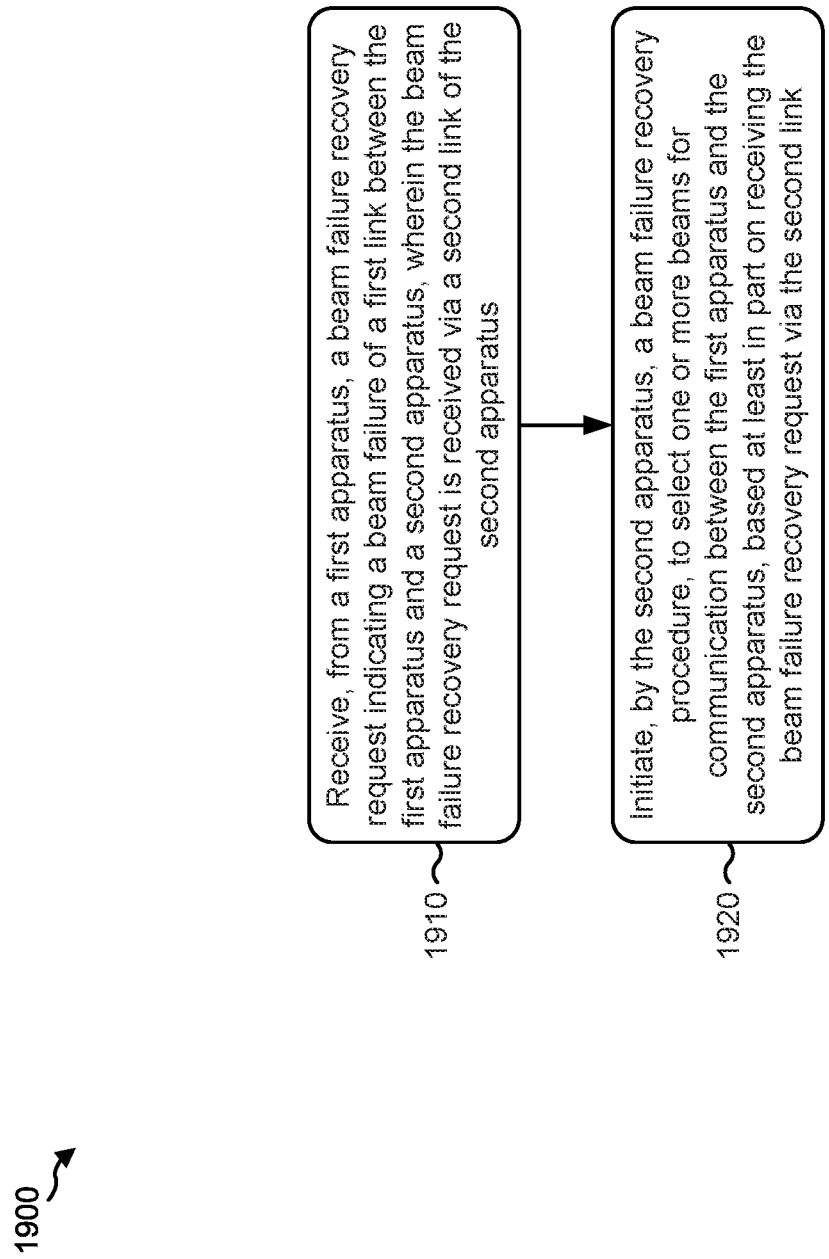

FIG. 19 is a diagram illustrating an example process 1900 performed, for example, by an apparatus, in accordance with various aspects of the present disclosure. Example process 1900 is an example where an apparatus (e.g., a second apparatus, such as one or more UEs described herein, one or more base stations described herein, and/or the like) uses a second link for beam failure recovery of a first link.

As shown in FIG. 19, in some aspects, process 1900 may include receiving, from a first apparatus, a beam failure recovery request indicating a beam failure of a first link between the first apparatus and a second apparatus, wherein the beam failure recovery request is received via a second link of the second apparatus (block 1910). For example, the second apparatus may receive, from the first apparatus and via the second link, a beam failure recovery request indicating a beam failure of the first link between the first apparatus and the second apparatus, as described above in connection with FIGS. 6-17.

As further shown in FIG. 19, in some aspects, process 1900 may include initiating, by the second apparatus, a beam failure recovery procedure, to select one or more beams for communication between the first apparatus and the second apparatus, based at least in part on receiving the beam failure recovery request via the second link (block 1920). For example, the second apparatus may initiate a beam failure recovery procedure to select one or more beams for communication between the first apparatus and the second apparatus, as described above in connection with FIGS. 6-17. In some aspects, the second apparatus may initiate the beam failure recovery procedure based at least in part on receiving the beam failure recovery request via the second link.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be openended terms. Further, the phrase "based on" is intended to mean "based, at least in part, on" unless explicitly stated otherwise.

What is claimed is:

1. A method of wireless communication, comprising:
detecting, by a first apparatus, a beam failure of a first link between the first apparatus and a second apparatus, wherein the first link is a direct link between the first apparatus and the second apparatus;
transmitting, by the first apparatus, a beam failure recovery request indicating the beam failure of the first link, wherein the beam failure recovery request is transmitted via a second link of the first apparatus, wherein the second link is an indirect link between the first apparatus and the second apparatus via a third apparatus, and wherein the second apparatus is a base station; and
performing, by the first apparatus, a beam failure recovery procedure to select one or more beams for communication between the first apparatus and the second apparatus.

2. The method of claim 1, wherein the first link and the second link use a same frequency band.

3. The method of claim 2, wherein the same frequency band is a millimeter wave frequency band.

4. The method of claim 1, wherein the first link uses a first frequency band and the second link uses a second frequency band.

5. The method of claim 4, wherein the first frequency band is a millimeter wave frequency band and the second frequency band is a sub-6 gigahertz frequency band.

6. The method of claim 1, wherein a beam management configuration, that indicates one or more resources associated with performing the beam failure recovery procedure, is communicated via the second link.

7. The method of claim 1, wherein the beam failure recovery request indicates the one or more beams to be used for communication between the first apparatus and the second apparatus.

8. A method of wireless communication, comprising:
receiving, from a first apparatus, a beam failure recovery request indicating a beam failure of a first link between the first apparatus and a second apparatus, wherein the beam failure recovery request is received via a second link of the second apparatus, wherein the first link is a direct link between the first apparatus and the second apparatus, wherein the second link is an indirect link between the first apparatus and the second apparatus via a third apparatus, and wherein the second apparatus is a base station; and
initiating, by the second apparatus, a beam failure recovery procedure to select one or more beams for communication between the first apparatus and the second apparatus.

9. The method of claim 8, wherein the first link and the second link use a same frequency band.

10. The method of claim 8, wherein the first link uses a first frequency band and the second link uses a second frequency band.

11. The method of claim 8, wherein the first link and the second link use a millimeter wave frequency band, or wherein the first link uses a millimeter wave frequency band and the second link uses a sub-6 gigahertz frequency band.

12. A first apparatus for wireless communication, comprising:
a memory; and
one or more processors coupled to the memory and configured to:
detect a beam failure of a first link between the first apparatus and a second apparatus, wherein the first link is a direct link between the first apparatus and the second apparatus;
transmit a beam failure recovery request indicating the beam failure of the first link, wherein the beam failure recovery request is transmitted via a second link of the first apparatus, wherein the second link is an indirect link between the first apparatus and the second apparatus via a third apparatus, and wherein the second apparatus is a base station; and
perform a beam failure recovery procedure to select one or more beams for communication between the first apparatus and the second apparatus.

13. The first apparatus of claim 12, wherein the first link and the second link use a same frequency band.

14. The first apparatus of claim 13, wherein the same frequency band is a millimeter wave frequency band.

15. The first apparatus of claim 12, wherein the first link uses a first frequency band and the second link uses a second frequency band.

16. The first apparatus of claim 15, wherein the first frequency band is a millimeter wave frequency band and the second frequency band is a sub-6 gigahertz frequency band.

17. The first apparatus of claim 12, wherein a beam management configuration, that indicates one or more resources associated with performing the beam failure recovery procedure, is communicated via the second link.

18. The first apparatus of claim 12, wherein the beam failure recovery request indicates the one or more beams to be used for communication between the first apparatus and the second apparatus.

19. A second apparatus for wireless communication, comprising:
a memory; and
one or more processors coupled to the memory and configured to:
receive, from a first apparatus, a beam failure recovery request indicating a beam failure of a first link between the first apparatus and the second apparatus, wherein the beam failure recovery request is received via a second link of the second apparatus, wherein the first link is a direct link between the first apparatus and the second apparatus, wherein the second link is an indirect link between the first apparatus and the second apparatus via a third apparatus, and wherein the second apparatus is a base station; and
initiate a beam failure recovery procedure to select one or more beams for communication between the first apparatus and the second apparatus.

20. The second apparatus of claim 19, wherein the first link and the second link use a same frequency band.

21. The second apparatus of claim 19, wherein the first link uses a first frequency band and the second link uses a second frequency band.

22. The second apparatus of claim 19, wherein the first link and the second link use a millimeter wave frequency band, or wherein the first link uses a millimeter wave frequency band and the second link uses a sub-6 gigahertz frequency band.

23. The first apparatus of claim 12, wherein the first apparatus is a user equipment.

24. The first apparatus of claim 12, wherein the third apparatus is a different base station.

25. The first apparatus of claim 12, wherein the beam failure is a full failure of all serving control channels associated with one or more of the first apparatus or the first link.

26. The first apparatus of claim 12, wherein the beam failure is a partial failure of serving control channels associated with one or more of the first apparatus or the first link.

27. The first apparatus of claim 12, wherein the second link is an ultra-reliable low latency communication (URLLC) link.

28. The first apparatus of claim 12, wherein the one or more processors are further configured to:
   transmit a first beam failure recovery request via the first link based on detecting the beam failure of the first link, wherein the beam failure recovery request is a second beam failure recovery request.

29. The first apparatus of claim 28, wherein the second beam failure recovery request is transmitted via the second link without waiting for a response to the first beam failure recovery request transmitted via the first link.

30. The first apparatus of claim 12, wherein the beam failure recovery request is transmitted via the second link without transmitting a beam failure recovery request via the first link.

31. The method of claim 1, wherein the third apparatus is an apparatus that that relays the beam failure recovery request to the second apparatus.

32. The method of claim 1, wherein the beam failure recovery procedure is performed based at least in part on transmitting the beam failure recovery request via the second link.

33. The method of claim 8, wherein the third apparatus is an apparatus that that relays the beam failure recovery request to the second apparatus.

34. The method of claim 8, wherein the beam failure recovery procedure is initiated based at least in part on transmitting the beam failure recovery request via the second link.

35. The first apparatus of claim 12, wherein the third apparatus is an apparatus that that relays the beam failure recovery request to the second apparatus.

36. The first apparatus of claim 12, wherein the beam failure recovery procedure is performed based at least in part on transmitting the beam failure recovery request via the second link.

37. The second apparatus of claim 19, wherein the third apparatus is an apparatus that that relays the beam failure recovery request to the second apparatus.

38. The second apparatus of claim 19, wherein the beam failure recovery procedure is initiated based at least in part on transmitting the beam failure recovery request via the second link.

* * * * *